(12) United States Patent
Dugat

(10) Patent No.: US 10,232,409 B2
(45) Date of Patent: Mar. 19, 2019

(54) MODULAR HANDLING SYSTEM AND METHOD OF USING SAME

(71) Applicant: Robotica, Inc., Spring, TX (US)

(72) Inventor: Jay Mark Dugat, Spring, TX (US)

(73) Assignee: ROBOTICA, INC., Cypress, TX (US)

( * ) Notice: Subject to any disclaimer, the term of this patent is extended or adjusted under 35 U.S.C. 154(b) by 360 days.

(21) Appl. No.: 14/550,826

(22) Filed: Nov. 21, 2014

(65) Prior Publication Data

US 2015/0144536 A1    May 28, 2015

Related U.S. Application Data

(60) Provisional application No. 61/907,418, filed on Nov. 22, 2013.

(51) Int. Cl.
| | |
|---|---|
| *B65G 13/12* | (2006.01) |
| *B07C 5/36* | (2006.01) |
| *B65G 21/14* | (2006.01) |
| *B65G 41/00* | (2006.01) |

(52) U.S. Cl.
CPC ............ *B07C 5/36* (2013.01); *B65G 13/12* (2013.01); *B65G 21/14* (2013.01); *B65G 41/002* (2013.01); *B65G 41/008* (2013.01); *B65G 2207/30* (2013.01)

(58) Field of Classification Search
CPC .......... B07C 5/36; B65G 13/02; B65G 13/12; B65G 37/02; B65G 47/53; B65G 47/54; B65G 2207/30; B65G 2207/34; B65G 2812/02029; B65G 2812/02554; B65G 21/14
USPC ..... 198/300, 597, 598, 370.09, 861.2, 861.4
See application file for complete search history.

(56) References Cited

U.S. PATENT DOCUMENTS

| | | | | |
|---|---|---|---|---|
| 1,603,633 A | * | 10/1926 | Nelson ................... | B65G 37/00 198/583 |
| 1,737,762 A | | 7/1928 | Howe | |
| 2,590,359 A | * | 3/1952 | Zopf ..................... | B65G 13/12 193/35 TE |

(Continued)

FOREIGN PATENT DOCUMENTS

DE        2259273        12/1972

OTHER PUBLICATIONS

News Track Conveyor Units Brochure, Mar. 2013, 2 pages.

*Primary Examiner* — Joseph C Rodriguez
(74) *Attorney, Agent, or Firm* — Nolte Intellectual Property Law Group

(57) ABSTRACT

A modular handling system and method for transporting cases is disclosed. The system includes at least one mobile base including a base frame with a base diverter thereon and at least one collapsible wing. The base frame is supported by wheeled legs. The collapsible wing includes a wing frame. The wing frame is operatively connectable to the mobile base, and is supported by collapsible legs. The wing frame and the collapsible legs are movable between an operational position and a collapsed position whereby a configurable path is movably positionable about a work space. A sorting system including at least one sorter mounted to the mobile base(s) may also be provided. Each sorter is operatively connectable to the mobile bases to identify and route the cases. The sorters are interactively coupled for communication therebetween whereby the cases are selectively movable about the configurable path.

49 Claims, 23 Drawing Sheets

(56) References Cited

U.S. PATENT DOCUMENTS

| | | | | |
|---|---|---|---|---|
| 2,993,583 A * | 7/1961 | Sykes | ............... | B65G 47/54 198/370.07 |
| 3,104,004 A | 9/1963 | Poel | | |
| 3,232,409 A | 1/1966 | Pierson | | |
| 3,944,054 A * | 3/1976 | Ensinger | ............... | B65G 21/06 198/835 |
| 4,014,428 A * | 3/1977 | Ossbahr | ............... | B23Q 7/1426 198/345.3 |
| 4,192,496 A * | 3/1980 | Baselice | ............... | B65H 1/263 198/463.3 |
| 4,200,178 A | 4/1980 | Gunti | | |
| 4,256,213 A | 3/1981 | Shaw et al. | | |
| 4,269,302 A | 5/1981 | Garvey | | |
| 4,629,302 A | 12/1986 | Willcox | | |
| 4,653,961 A | 3/1987 | Hashimoto | | |
| 4,715,488 A * | 12/1987 | Hewitt | ............... | B65G 13/12 193/35 R |
| 4,730,718 A | 3/1988 | Fazio | | |
| 4,804,081 A | 2/1989 | Lenhardt | | |
| 4,962,841 A | 10/1990 | Kloosterhouse | | |
| 5,150,781 A * | 9/1992 | Deisenroth | ............... | B65G 1/0478 198/349.8 |
| 5,165,516 A | 11/1992 | Reed | | |
| 5,172,804 A * | 12/1992 | Chersin | ............... | B65G 21/14 198/346.1 |
| 5,217,110 A | 6/1993 | Spangler et al. | | |
| 5,351,809 A * | 10/1994 | Gilmore | ............... | B65G 21/14 198/594 |
| 5,456,348 A * | 10/1995 | Whetsel | ............... | B65G 13/12 198/782 |
| 5,568,857 A * | 10/1996 | Chen | ............... | B65G 13/12 198/581 |
| 5,699,892 A | 12/1997 | Shyr et al. | | |
| 5,718,325 A * | 2/1998 | Doster | ............... | B65G 43/08 193/35 TE |
| 5,911,300 A * | 6/1999 | Mraz | ............... | B65G 41/008 198/303 |
| 5,971,132 A | 10/1999 | Bonnet | | |
| 5,984,078 A | 11/1999 | Bonnet | | |
| 6,068,111 A * | 5/2000 | Smith | ............... | B65G 13/12 193/35 TE |
| 6,073,747 A | 6/2000 | Takino | ............... | B65G 13/10 198/370.09 |
| 6,227,377 B1 | 5/2001 | Bonnet | | |
| 6,264,042 B1 | 7/2001 | Cossey | | |
| 6,471,031 B1 | 10/2002 | Duncalf | | |
| 6,533,096 B2 * | 3/2003 | Gilmore | ............... | B65G 21/14 193/35 TE |
| 6,595,349 B2 | 7/2003 | Macswan | | |
| 6,629,018 B2 | 9/2003 | Mondie | | |
| 6,719,119 B1 * | 4/2004 | Hendzel | ............... | B65G 13/12 193/35 TE |
| 6,782,993 B2 | 8/2004 | Bernard et al. | | |
| 6,843,365 B2 | 1/2005 | Baker | | |
| 6,907,978 B2 | 6/2005 | Evans | | |
| 6,957,736 B2 | 10/2005 | Bonifer et al. | | |
| 7,150,383 B2 * | 12/2006 | Talken | ............... | B26D 7/32 198/588 |
| 7,261,198 B2 * | 8/2007 | Tatar | ............... | B07C 3/065 198/370.01 |
| 7,641,043 B2 * | 1/2010 | Vestergaard | ............... | B64D 9/00 193/35 R |
| 7,909,153 B2 * | 3/2011 | Pogue | ............... | B65G 21/14 198/312 |
| 8,561,790 B2 | 10/2013 | Brayman | | |
| 8,684,169 B2 * | 4/2014 | Itoh | ............... | B65G 13/075 198/370.06 |
| 8,827,623 B2 * | 9/2014 | Stelter | ............... | B64F 1/32 198/588 |
| 9,110,773 B2 * | 8/2015 | Roush | ............... | B65G 41/002 |
| 9,216,862 B2 | 12/2015 | Wallace | | |
| 9,475,653 B2 | 10/2016 | Dugat | | |
| 2004/0211651 A1 | 10/2004 | Hall | | |
| 2004/0226803 A1 | 11/2004 | Brixius et al. | | |
| 2007/0162174 A1 * | 7/2007 | Doke | ............... | B25J 9/0093 700/117 |
| 2007/0221471 A1 * | 9/2007 | Fourney | ............... | B65G 13/10 198/370.03 |
| 2008/0169171 A1 * | 7/2008 | Itoh | ............... | B65G 47/54 198/412 |
| 2009/0065327 A1 * | 3/2009 | Evangelista | ............... | B65G 41/008 198/300 |
| 2014/0041989 A1 | 2/2014 | Wallace | | |
| 2014/0346008 A1 | 11/2014 | Hoynash | | |
| 2016/0016684 A1 | 1/2016 | Dugat | | |
| 2016/0031580 A1 | 2/2016 | Dugat | | |
| 2016/0083196 A1 * | 3/2016 | Dugat | ............... | B65G 47/54 198/370.1 |
| 2017/0008706 A1 | 1/2017 | Dugat | | |
| 2017/0057756 A1 | 3/2017 | Dugat | | |

* cited by examiner

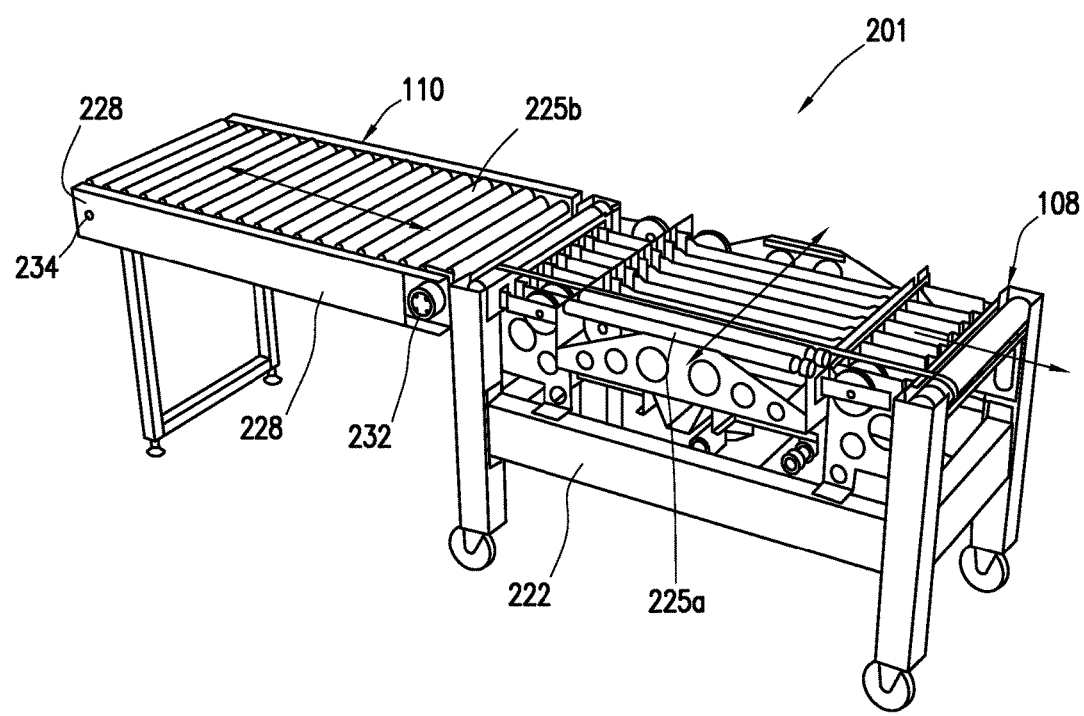
FIG. 2C1

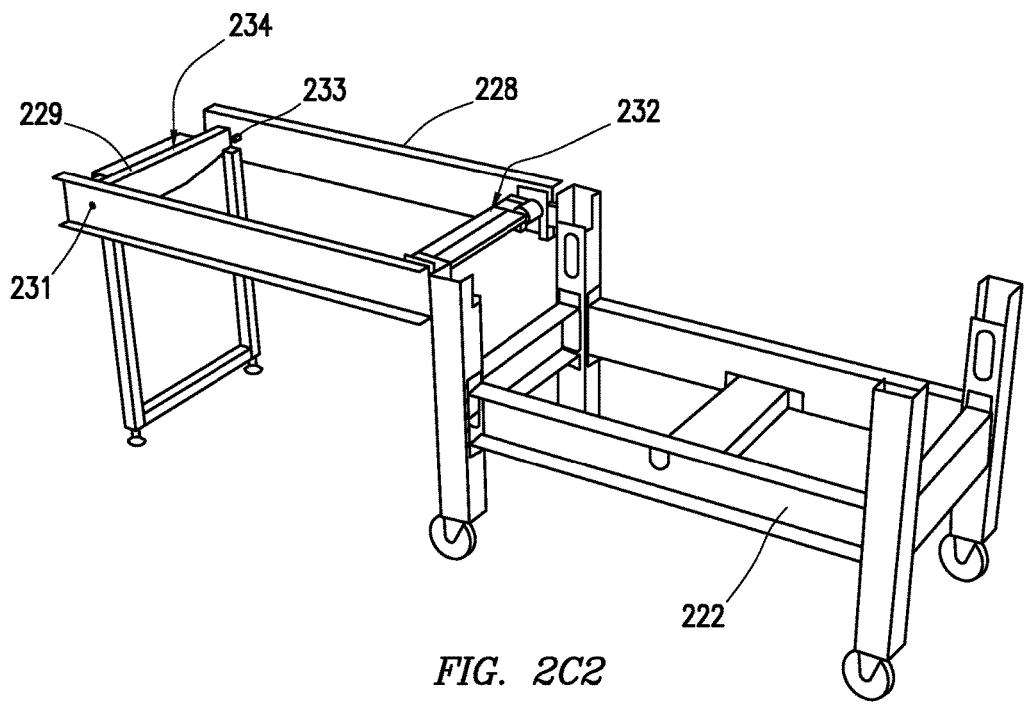
FIG. 2C2
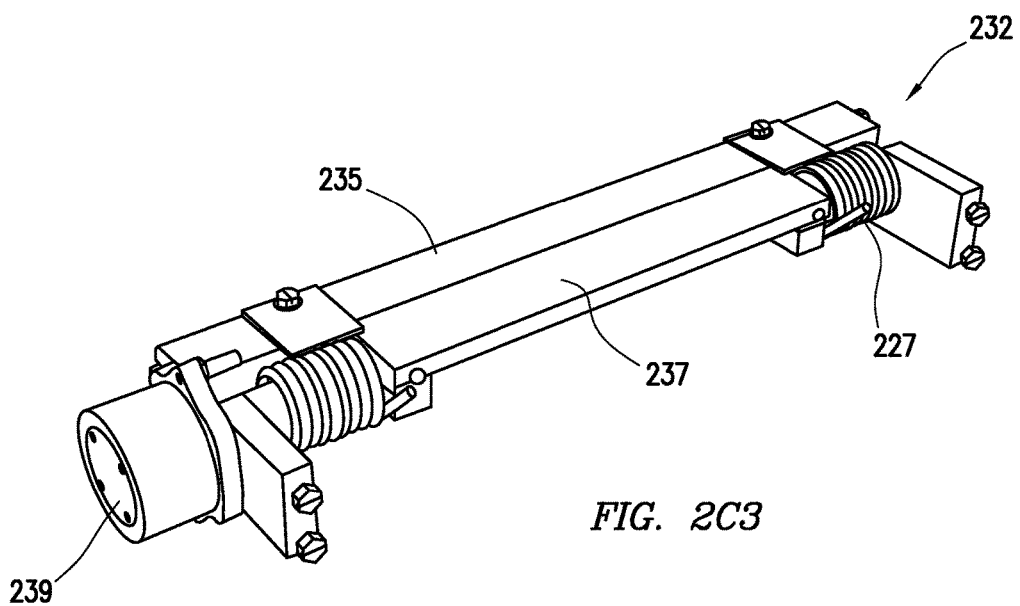
FIG. 2C3

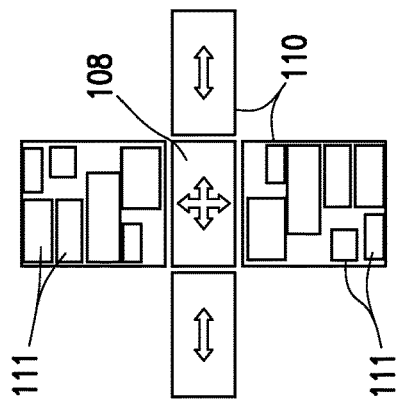
FIG. 9A4
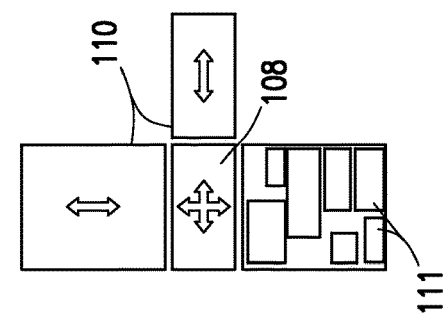
FIG. 9A3
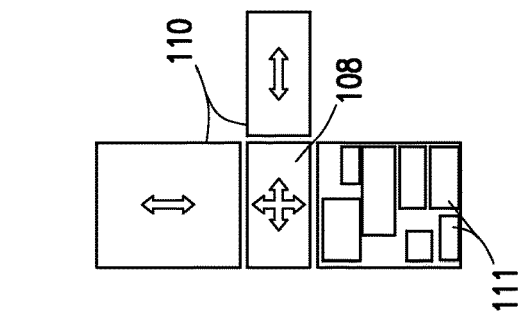
FIG. 9A2
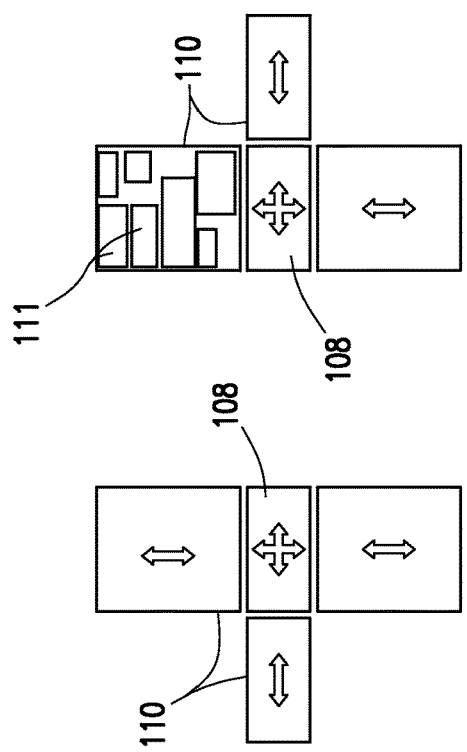
FIG. 9A1

MODULAR HANDLING SYSTEM AND METHOD OF USING SAME

CROSS-REFERENCE TO RELATED APPLICATIONS

This application claims priority to U.S. Provisional Application No. 61/907,418, filed on Nov. 22, 2013, the entire contents of which is hereby incorporated by reference herein. Applicant also has filed U.S. Patent Application No. 62/053,009, the entire contents of which is hereby incorporated by reference herein.

BACKGROUND

This present disclosure relates generally to handling equipment. More specifically, the present disclosure relates to conveyors, sorters, and/or related equipment used in handling materials.

Conveyors include mechanical structures extending from one location to another to move the materials between such locations. For example, manufacturing industries may use conveyors to pass product components between workstations at the locations to enable assembly of the product components into a finished product. Such conveyors are fixed in place (e.g., bolted to the floor) in a manufacturing facility, and include frames with rollers or belts that enable the product components to pass along the frame to the workstations. Such conveyors may also be provided with replaceable rollers or belts that may wear out over time.

The fixed conveyors may extend between multiple locations in the facility. Sorting devices may be provided to divert the materials along the conveyors to certain locations in the facility. For example, facilities with large distribution centers, such as retail stores, may have automated sorting equipment coupled to the fixed conveyors to sort and divert packages along various portions of the conveyors to locations in the facility. The facilities may also employ forklifts and carts to transport the materials to or from the conveyors.

SUMMARY

In at least one aspect the disclosure relates to a modular handling system for transporting cases between locations. The handling system comprises at least one mobile base comprising a base frame with a base diverter thereon and at least one collapsible wing comprising a wing frame with wing rollers thereon. The base frame is supported by wheeled legs. The wing frame is operatively connectable to the mobile base, and is supported by collapsible legs. The wing frame and the collapsible legs are movable between an operational position and a collapsed position whereby a configurable conveyor path is movably positionable about a work space.

The collapsible wing includes at least one foldable wing comprising a fold-up wing pivotally connected to the base frame, a flexible wing laterally extendable from the mobile base, and/or at least one foldable wing comprising a pair of wing sections connected by a hinge therebetween. The collapsible legs comprise wheels and/or adjustable feet. The diverter comprises multi-directional rollers. The wing rollers comprise bi-directional rollers, powered rollers, and/or gravity rollers.

The collapsible wing is lighter than the at least one mobile base. The mobile base is polygonal. The mobile base comprises a rectangular base with four sides and wherein the collapsible wings comprise four collapsible wings, each of the collapsible wings operatively connectable to one of the four sides. At least one of the four collapsible wings is collapsible about the mobile frame to reduce floor space occupied thereby.

The handling system further comprises a base connector operatively connecting the wing frame to the base frame. The base connector comprises at least one of a torsion rod, axel, and a spring. The handling system further comprises a wing connector operatively connecting the collapsible legs to the wing frame. The wing connector comprises an axel, a pivot pin, and a stop. At least one of the mobile base and the collapsible wing is operatively connectable to a fixed handling system. The handling system also includes a sorting system operatively connected to the at least one mobile base.

The sorting system comprises at least one sorter. Each sorter is operatively connected to a corresponding one of the mobile bases, and is coupled by communication links. The sorters comprise at least one scanner, processor, power supply, and human machine interface. The modular handling system also includes a printer applicator and/or a box cutter.

In another aspect, the disclosure relates to a method for transporting cases between locations. The method involves movably positioning at least one mobile base about a workspace. Each of the mobile bases comprising a base frame with a base diverter thereon, the base frame supported by wheeled legs. The method also involves selectively configuring a conveyor path about the workspace by operatively connecting at least one collapsible wing to the mobile base. The collapsible wing comprises a wing frame with wing rollers thereon, and is supported by collapsible legs. The method also involves passing the cases about the conveyor path.

The method also involves selectively moving the wing frame and the collapsible legs between an operational position and a collapsed position, collapsing the collapsible wings about the mobile base by folding up the collapsible wing about the mobile base and collapsing the collapsible legs about the wing frame, collapsing the collapsible wings about the mobile base by compressing the collapsible wing about the mobile base, and/or collapsing the collapsible wings about the mobile base by folding wing sections of the collapsible wings.

The method may also involve sorting the cases and/or selectively adjusting the passing. The selectively configuring comprises operatively connecting one of the collapsible wings to each side of one of the mobile bases and collapsing at least one of the collapsible wings about the one of the mobile bases. The passing comprises transferring the cases from each of the mobile bases to one of a left, a right and a forward one of the collapsible wings.

In another aspect, the disclosure relates to a modular handling system for transporting cases between locations. The handling system includes at least one mobile base comprising a base frame with a base diverter thereon, at least one wing comprising a wing frame, and a sorting system. The base frame supported by wheeled legs. The wing frame is operatively connectable to the mobile base whereby a configurable conveyor path is movably positionable about a work space. The soiling system comprises at least one sorter mounted to the mobile base. Each of the sorters is operatively connectable to a corresponding one of the mobile bases to identify and route the cases thereabout. The sorter is interactively coupled for communication therebetween whereby the cases are selectively movable about the conveyor path.

The modular handling system further comprises a modular communication link removably coupling a plurality of the at least one sorters. The sorter comprises at least one human interface, at least one scanner, at least one processor, and at least one power supply. The scanner is operatively connectable to the base diverter to selectively divert the cases between the mobile base and a corresponding one of the wings. The wing is collapsible about the mobile base.

In yet another aspect, the disclosure relates to a method for transporting cases between locations. The method involves movably positioning at least one mobile base about a workspace. The mobile base comprising a base frame with a base diverter thereon. The method also involves selectively configuring a conveyor path about the workspace by operatively connecting at least one wing to the mobile base. The wing comprises a wing frame. The wing frame is supported by collapsible legs. The method also involves sorting the cases by scanning the cases and defining a route about the conveyor path based on the scanning, and passing the cases about the route.

The method further comprises removably coupling a sorting system about the mobile base. The sorting system comprising at least one sorter to perform the sorting. The method further comprises communicatively coupling each of the sorters. The method also involves identifying the mobile base and the wing with the sorter. The sorting also involves identifying dimensions of the case and wherein the passing comprises passing the cases according to the identified dimensions. The selectively configuring comprises operatively connecting a plurality of mobile bases and a plurality of the wings. The method further comprises selectively adjusting the route about portions of the conveyor paths, and/or repeating the method in a different configuration about the workspace. Finally, in another aspect, the disclosure relates to a sorting system comprising a receiving unit comprising a conveyor and a scanner, a sorter comprising a case transfer or diverter and a plurality of conveyor wings, and a distributed computing system comprising a plurality of processing units. The processing units being connected therebetween by a communications network.

The receiving unit further comprises a printer. At least one of the conveyor wings folds into a vertical position substantially aligning with a side edge of the case (right angle) transfer. At least one of the conveyor wings of the sorter is a powered conveyor. At least one of the conveyor wings of the sorter is a gravity conveyor. At least one of the conveyor wings of the sorter comprises a collector.

BRIEF DESCRIPTION DRAWINGS

So that the above recited features and advantages can be understood in detail, a more particular description, briefly summarized above, may be had by reference to the embodiments thereof that are illustrated in the appended drawings. It is to be noted, however, that the appended drawings illustrate example embodiments and are, therefore, not to be considered limiting of its scope. The figures are not necessarily to scale and certain features and certain views of the figures may be shown exaggerated in scale or in schematic in the interest of clarity and conciseness.

Figure 1A:
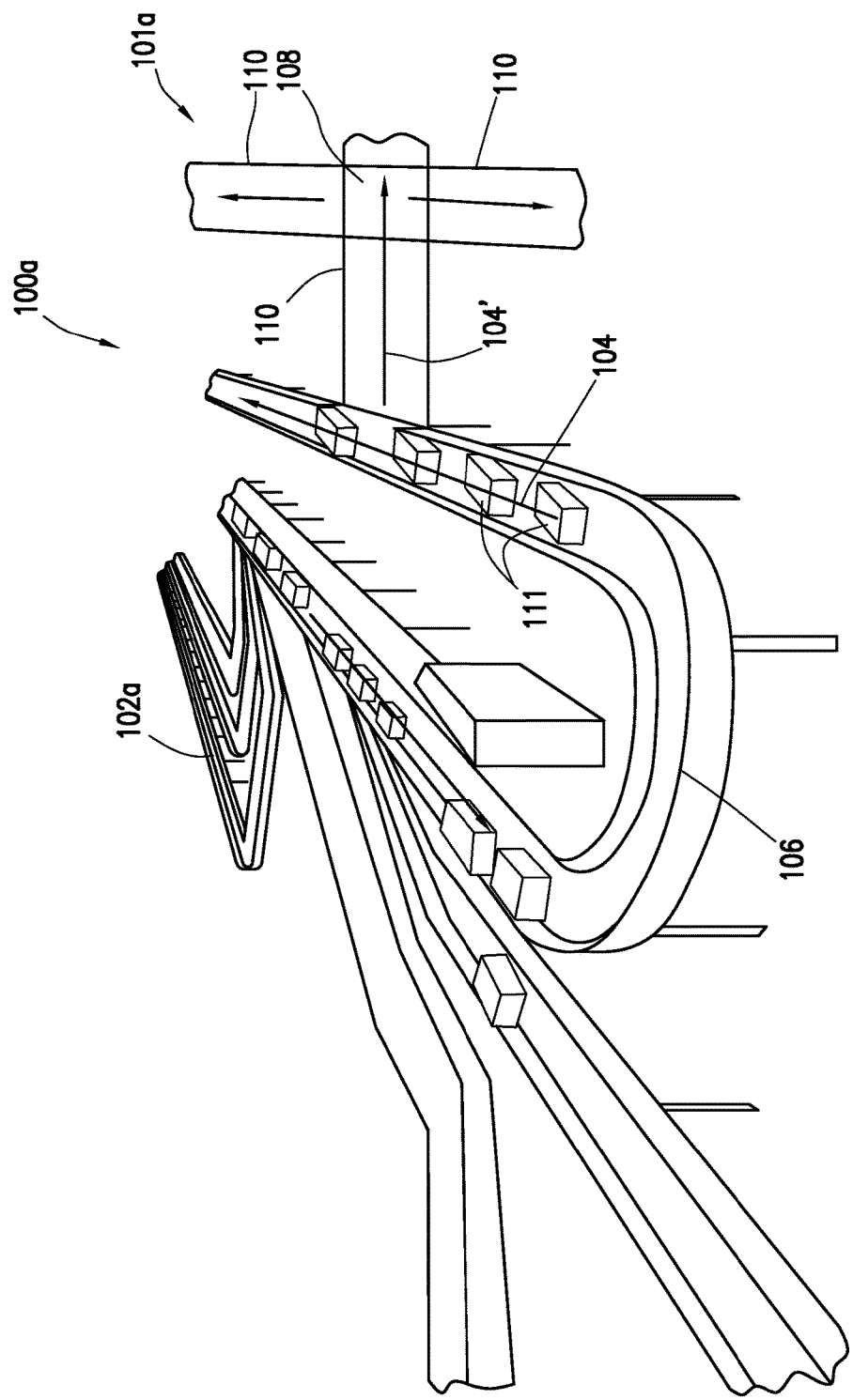
FIGS. 1A and 1B are schematic views of various facilities provided with a modular handling system.
Figure 1B:
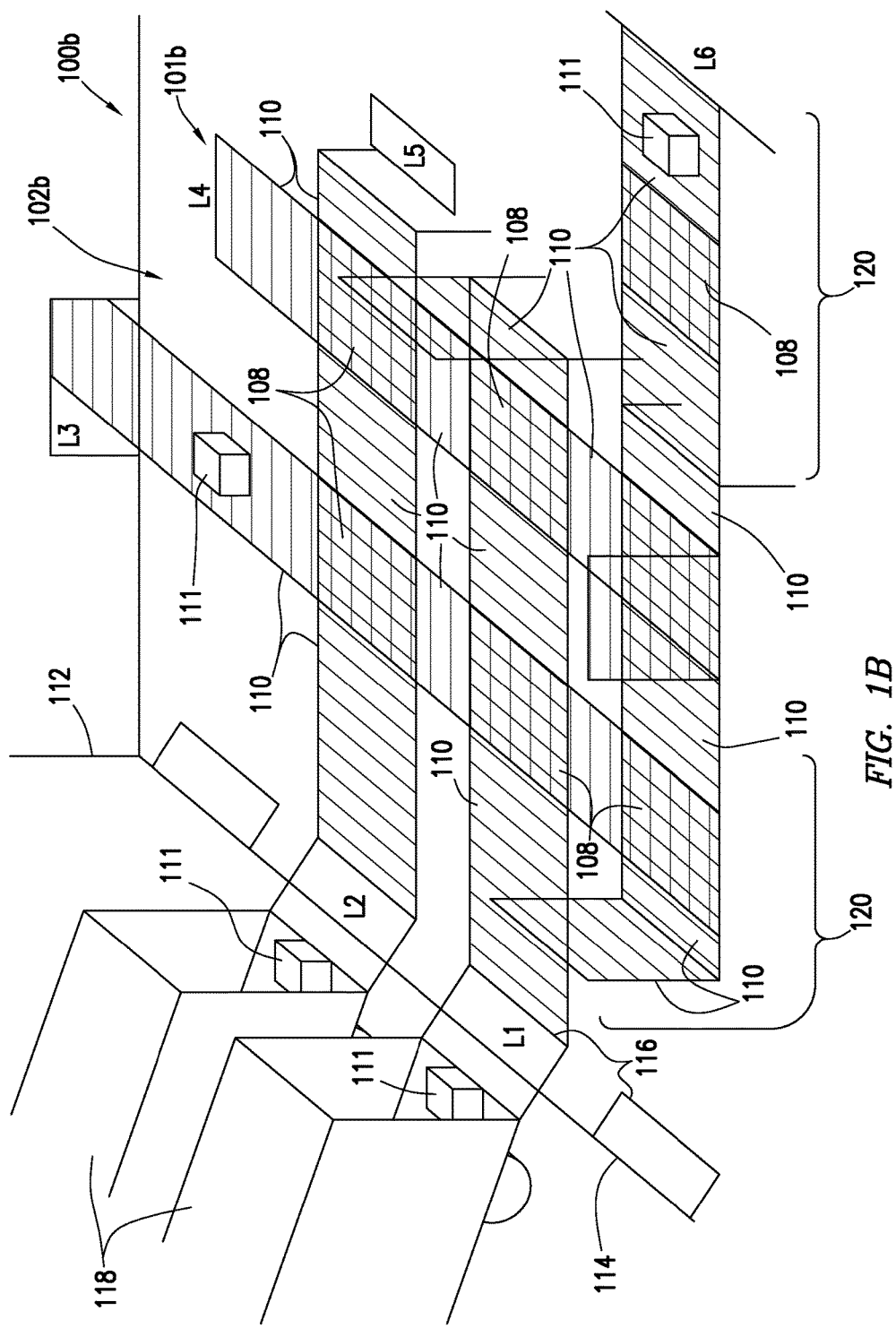
Figure 2A:
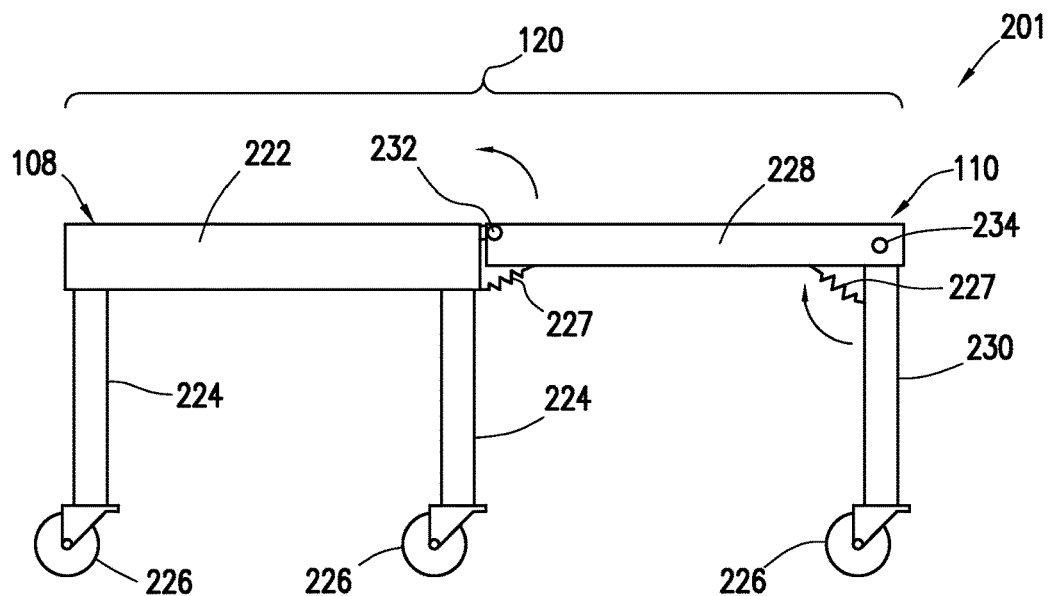
FIGS. 2A and 2B are schematic views of a modular handling system including a mobile base and a wing with wheels in an operational and a collapsed position, respectively.
Figure 3:
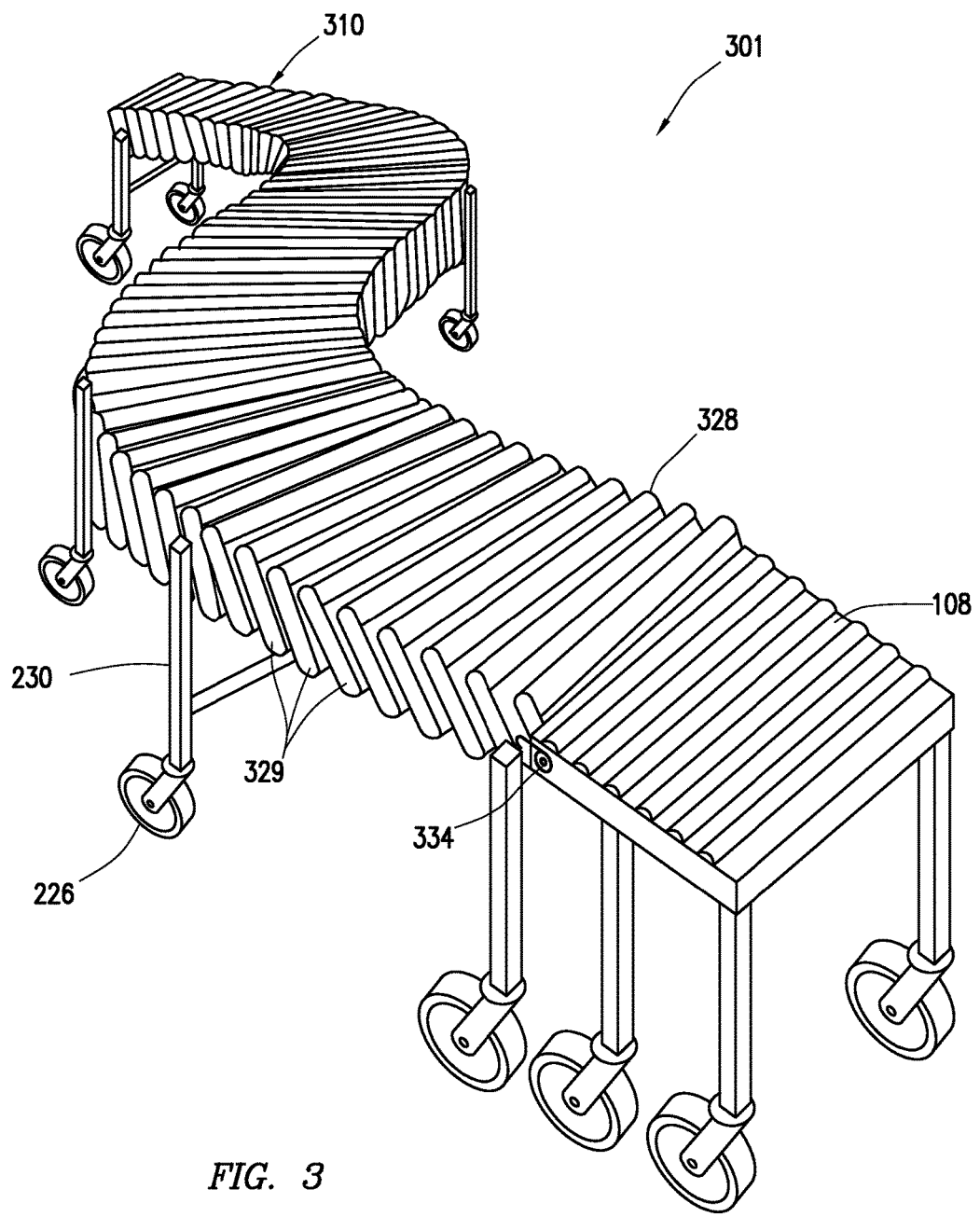

FIGS. 2C1-2C3 are various views of portions of the modular handling system of FIG. 2A depicting connectors thereof.

FIG. 3 is a perspective view of a flexible modular handling system including the mobile base with a flexible wing.

Figure 4A:
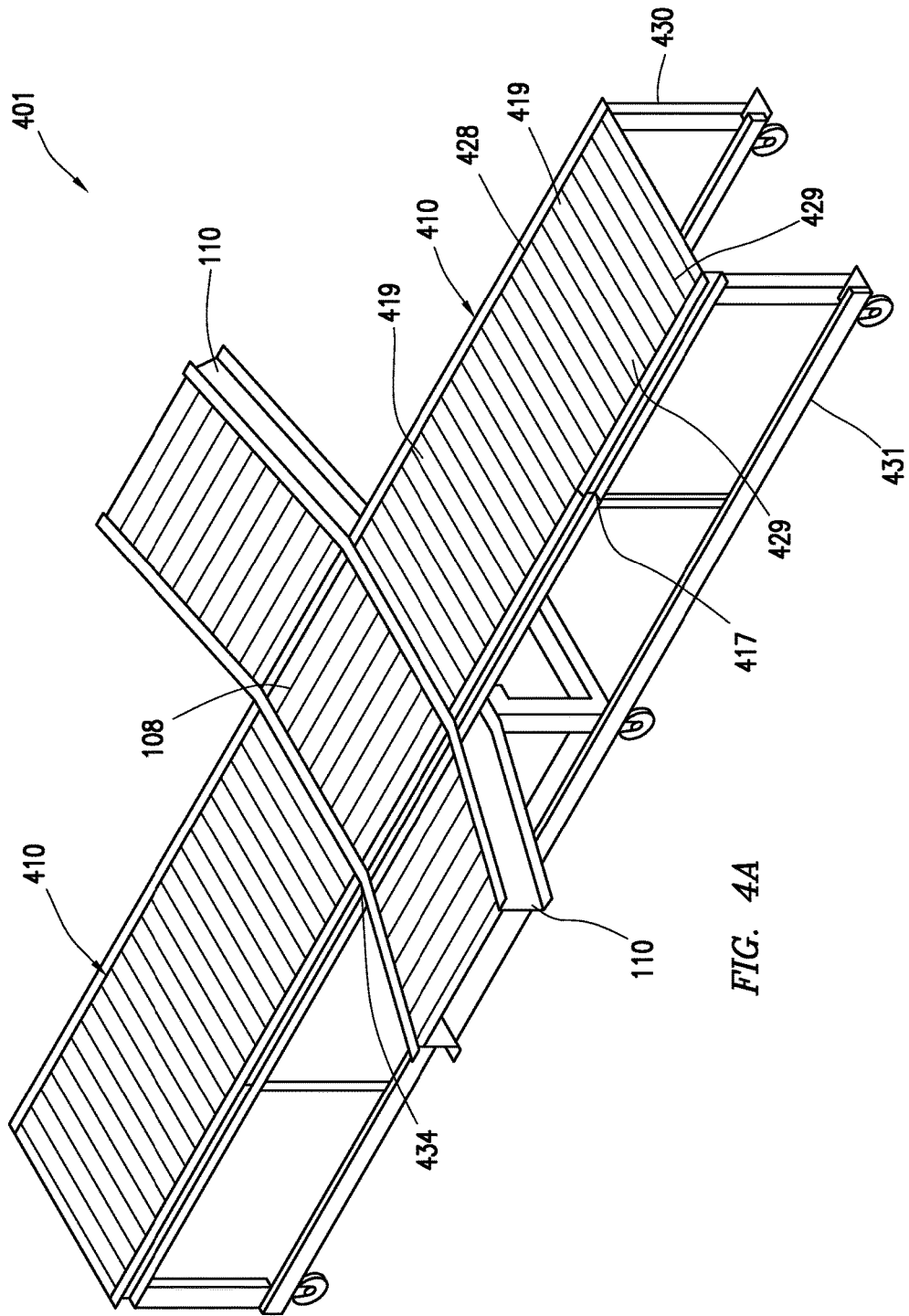
Figure 4B:
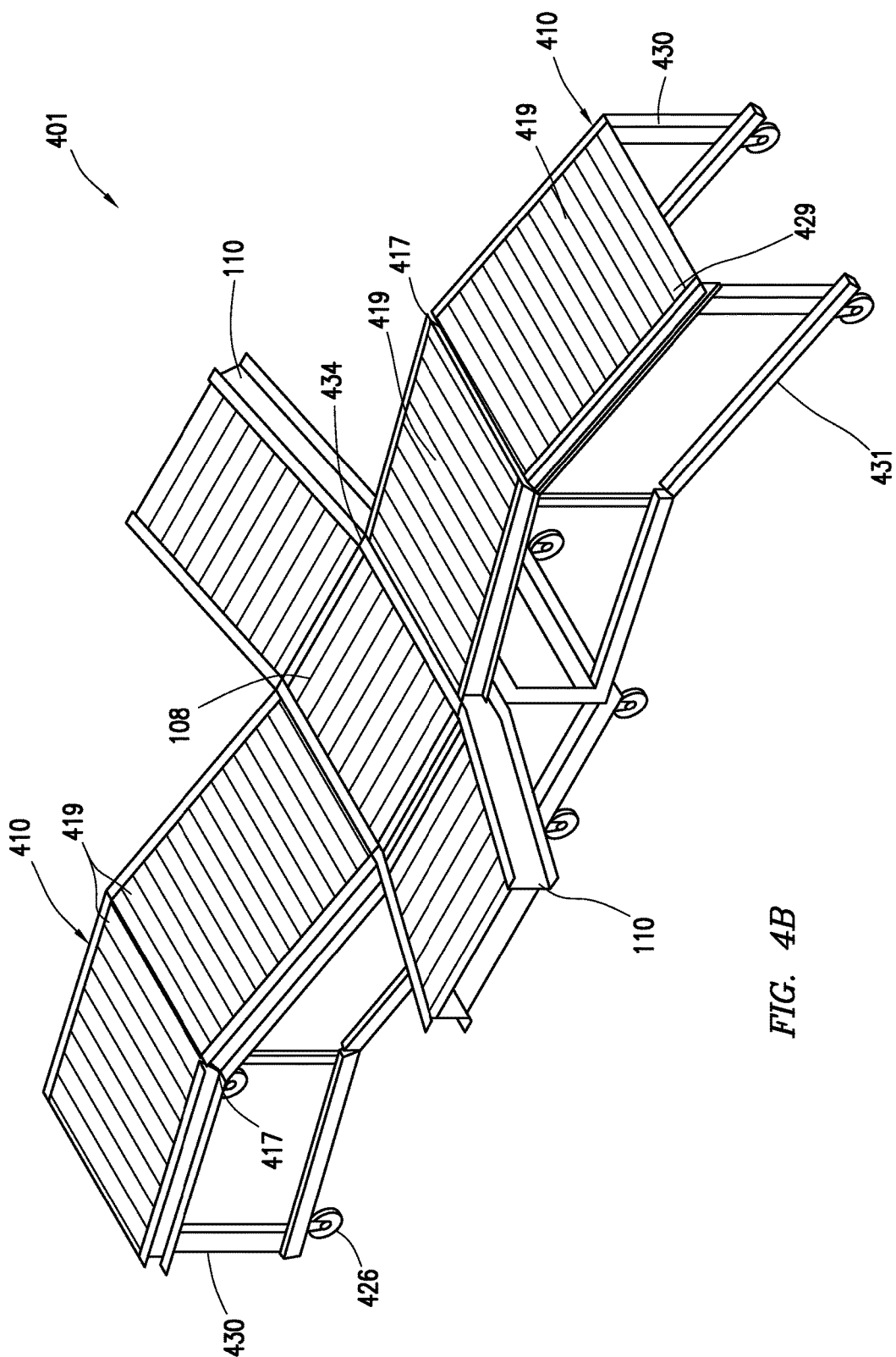
Figure 4C:
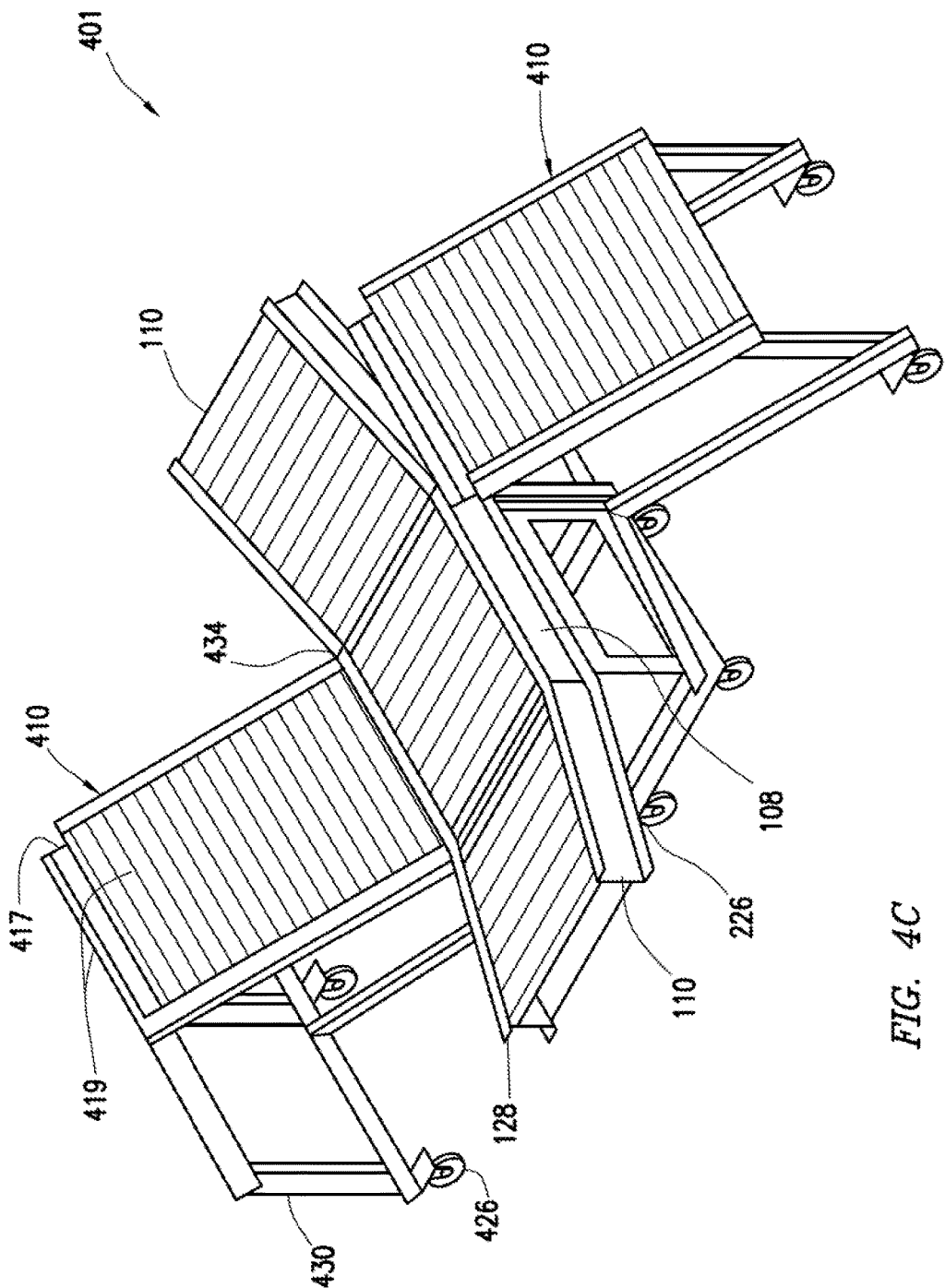

FIGS. 4A-4C are schematic views of a foldable modular handling system having foldable wings in an operational, partially collapsed, and mostly collapsed position, respectively.

Figure 5A:
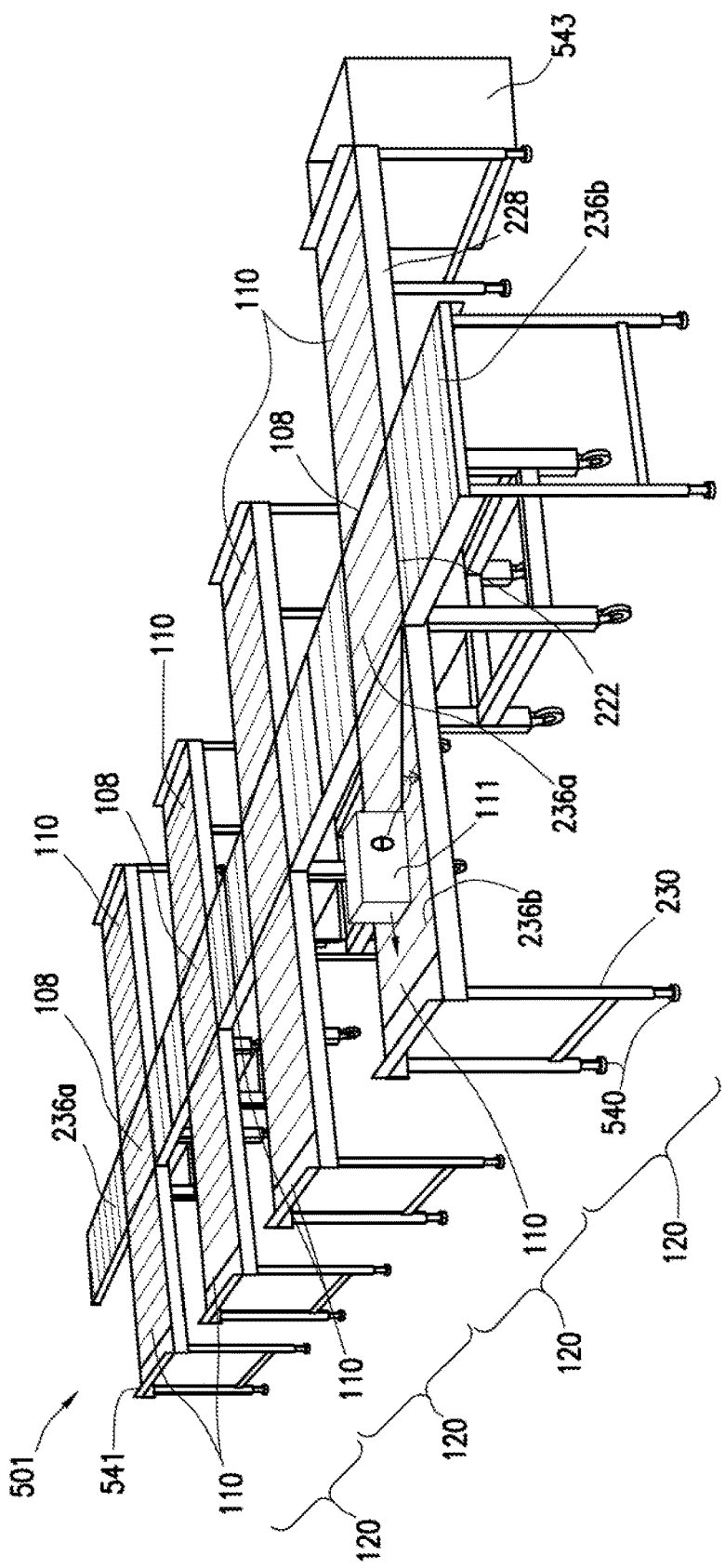
Figure 5B:
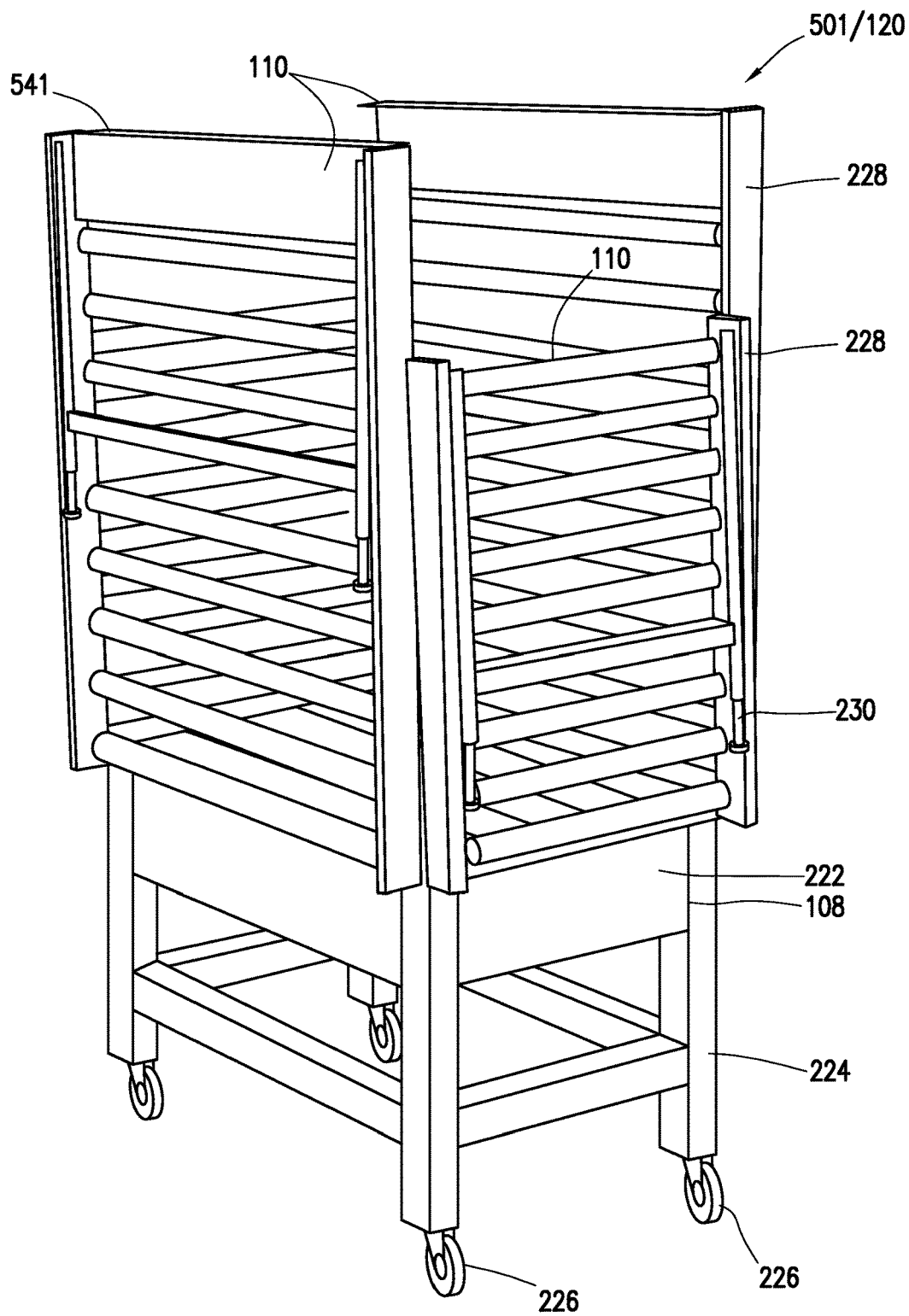

FIGS. 5A and 5B are schematic views of an integrated modular handling system having multiple mobile bases and multiple wings with adjustable legs in an operational and a collapsed position, respectively.

Figure 6A:
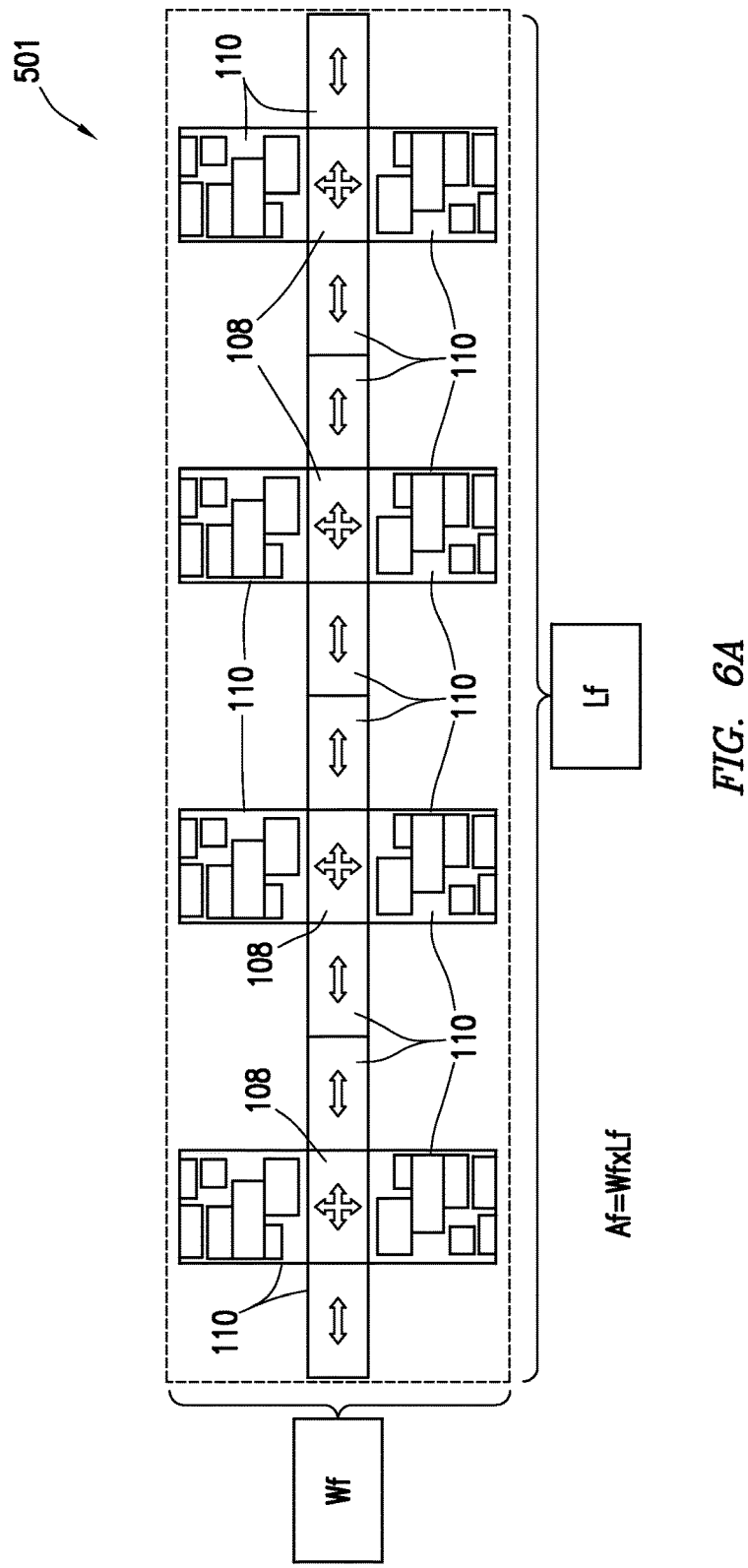
Figure 6B:
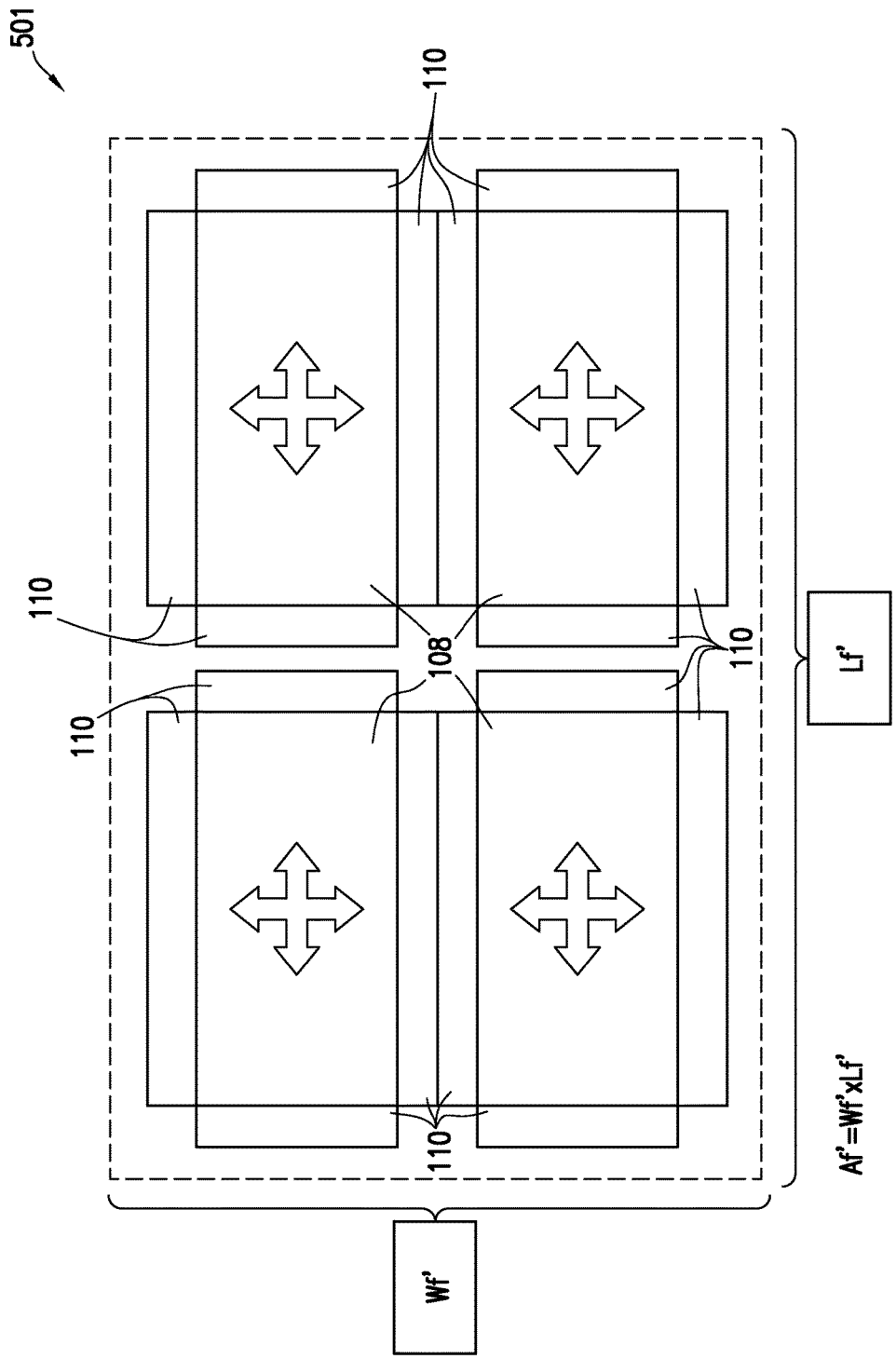

FIGS. 6A and 6B are schematic views illustrating space occupied by the modular handling system of FIG. 5A in an operational and a collapsed position, respectively.

Figure 7A:
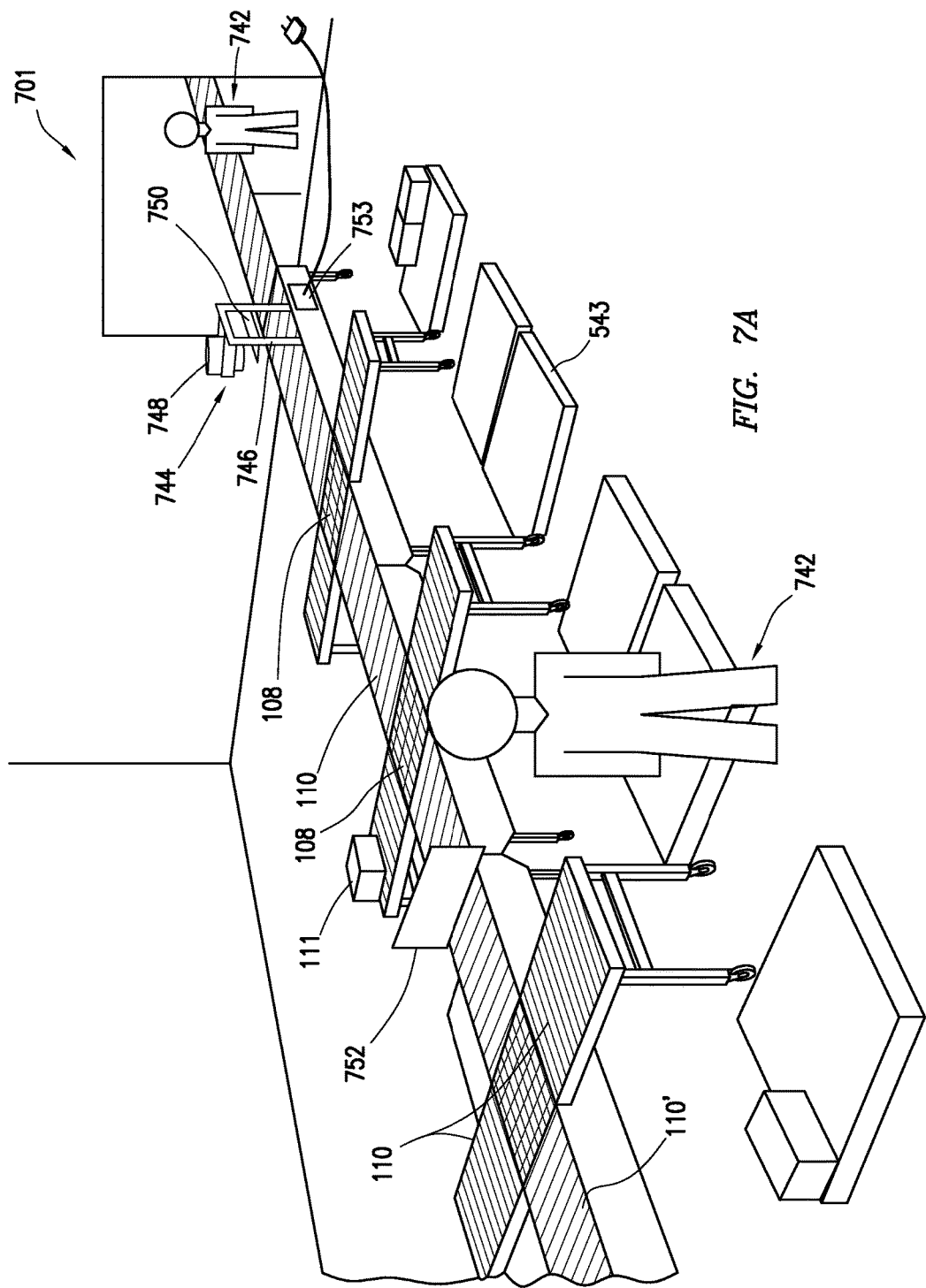
Figure 7B:
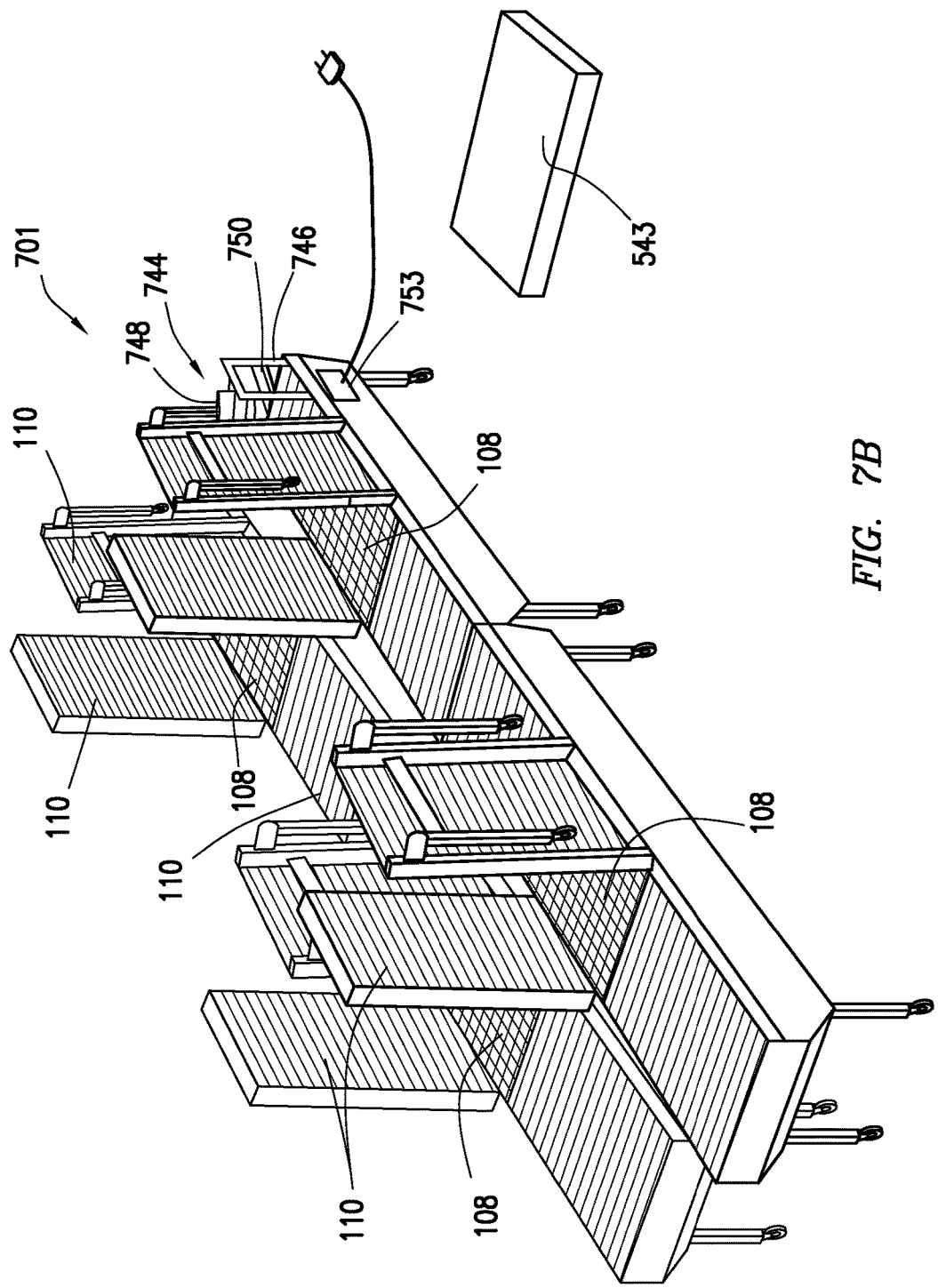

FIGS. 7A and 7B are schematic views of another integrated modular handling system having multiple mobile bases and multiple wings with wheels in an operational and a collapsed position, respectively.

Figure 8A:
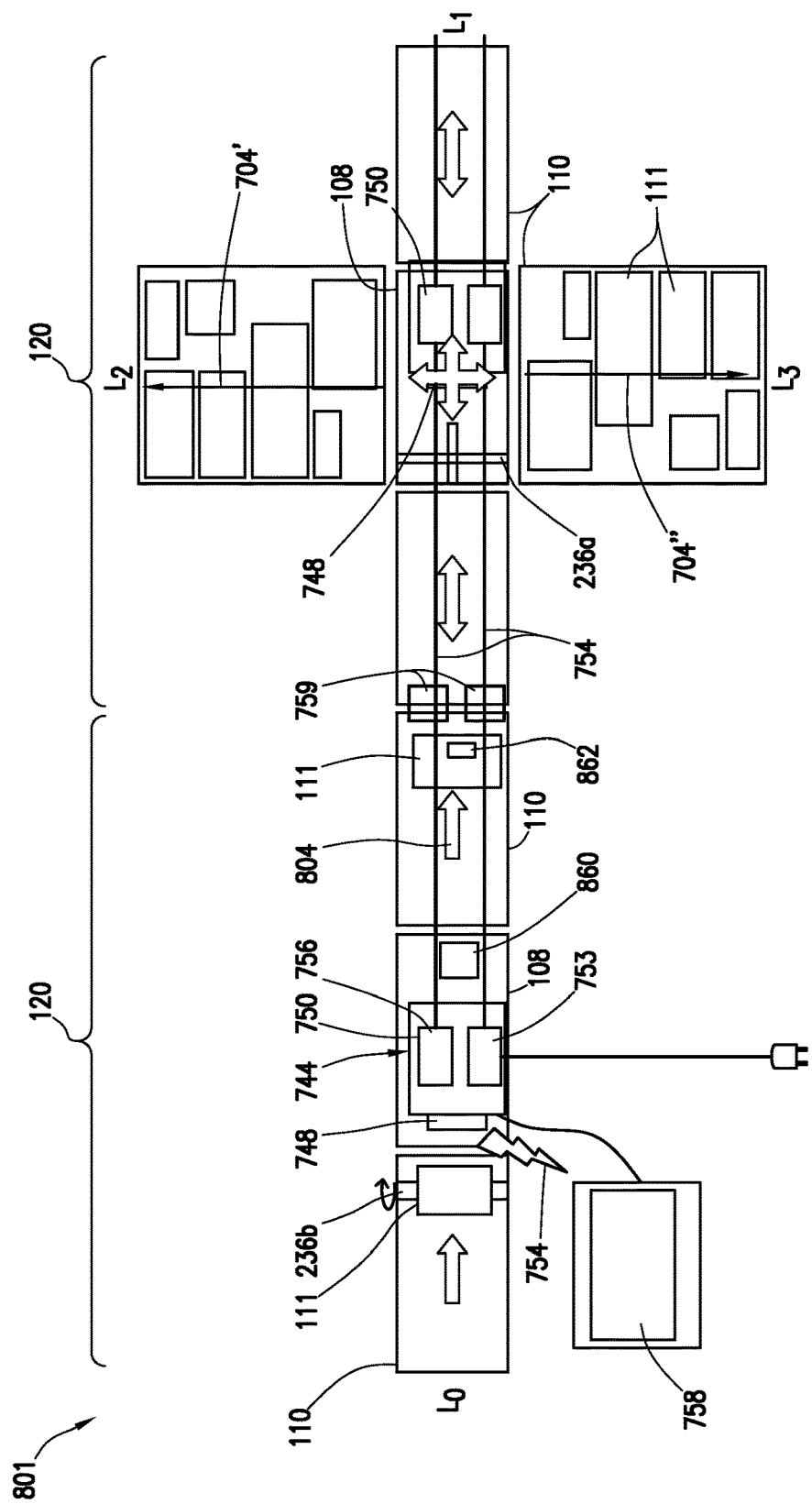
Figure 8B:
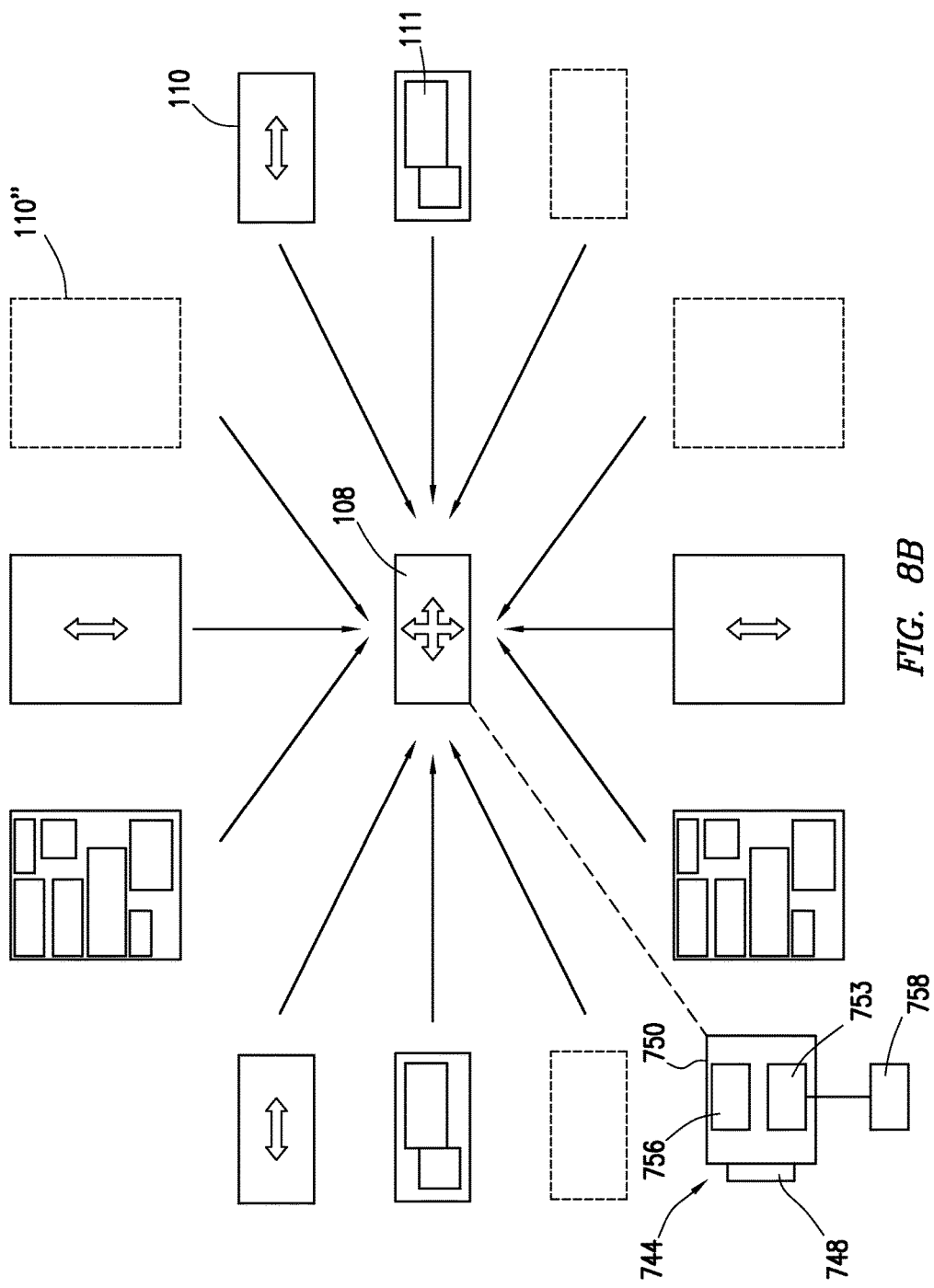

FIGS. 8A and 8B are schematic diagrams depicting the modular handling system with a sorting system.

FIGS. 9A1-A4 and 9B are schematic diagrams depicting sorting by the sorting system.

Figure 10A:
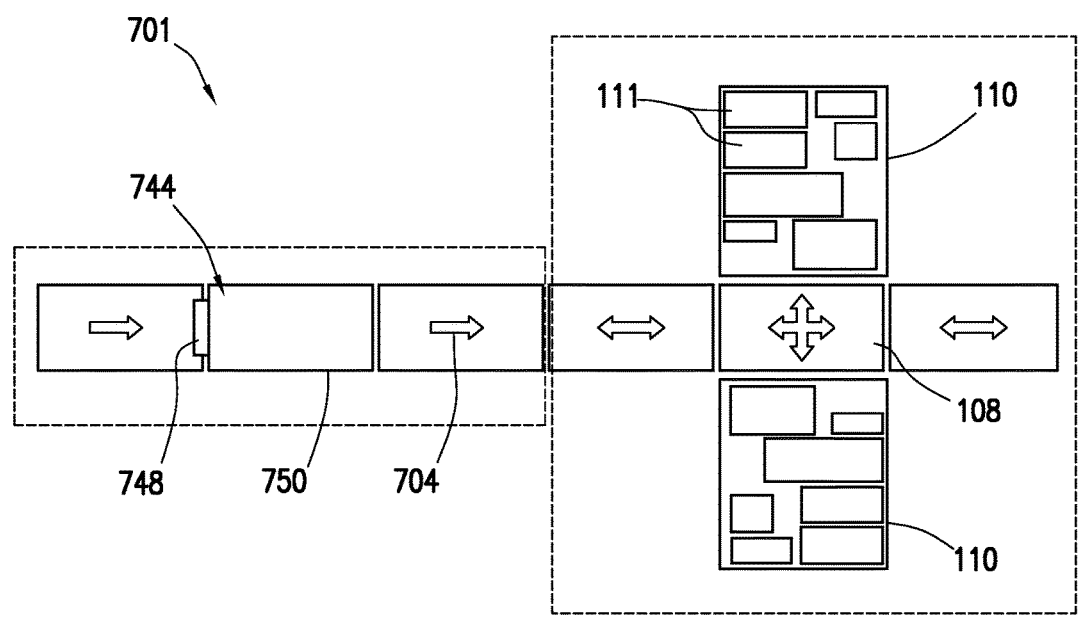
Figure 10B:
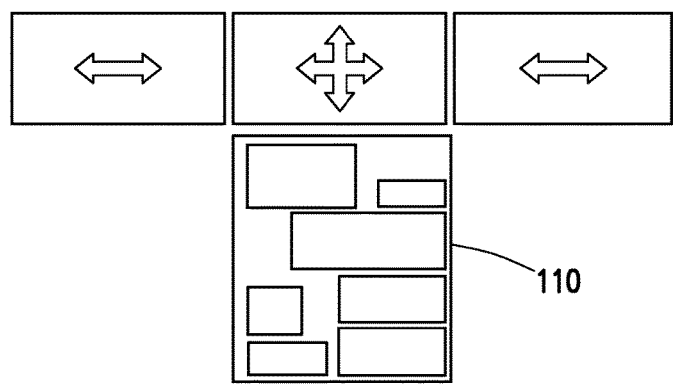

FIGS. 10A and 10B are schematic diagrams depicting case spacing optimization using the sorting system.

Figure 11A:
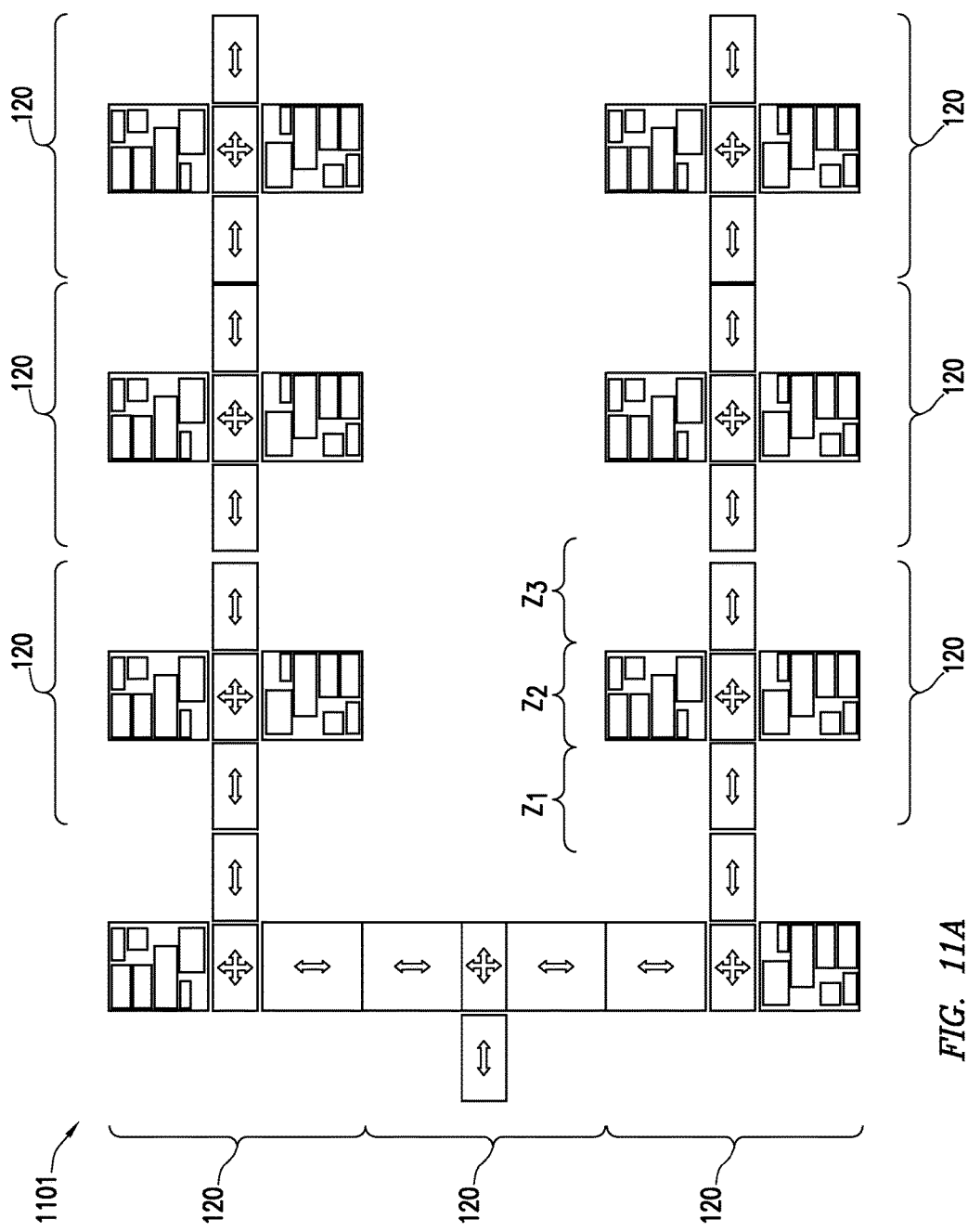
Figure 11B:
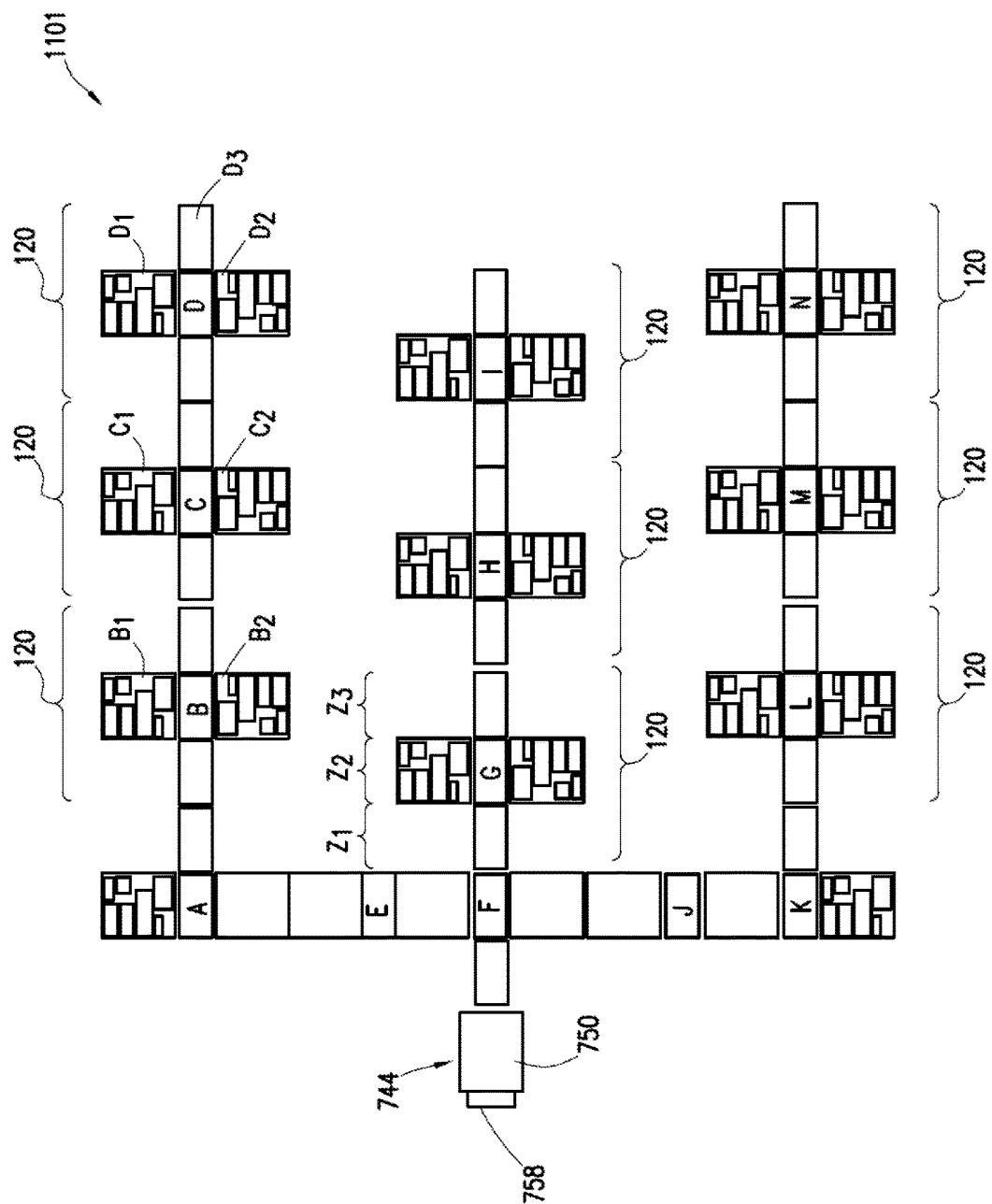

FIGS. 11A and 11B are schematic diagrams depicting sorting scenarios performed using the sorting system.

Figure 12:
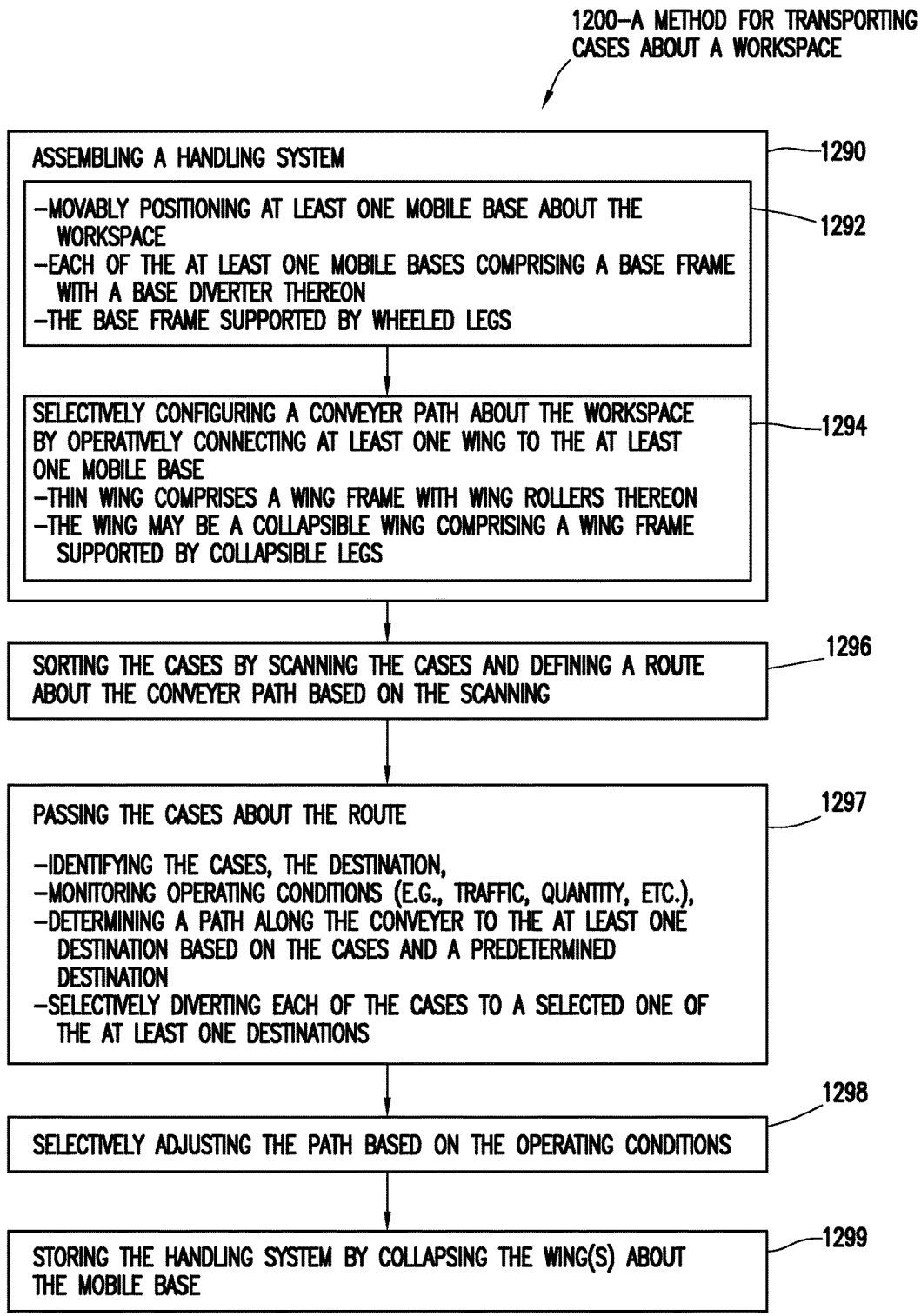

FIG. 12 is a flow chart depicting a method of transporting cases about a location.

DETAILED DESCRIPTION

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the subject matter. In addition, like or identical reference numerals may be used to identify common or similar elements. It will also be noted that while certain material (e.g., previous provisional patent applications) may be incorporated herein, certain limitations and/or feature contained therein may be broader in the present application.

Introduction

A modular handling (or conveyor) system is provided to transport cases (e.g., materials, packages, carton, bags, and/or other discrete items) between locations in a facility. The handling system includes one or more mobile bases (or center sort module) and one or more connectable (or conveyor) wings. The mobile bases and wings may be moved to a workspace and combined in a desired configuration to form a conveyor path between transport locations. The handling system may be moved into and out of work areas, and collapsed to reduce floor space when not in use. The handling system may be modular to provide for various configurations mobile (or movable) for placement in desired locations.

The handling system may be provided with a modular sorting system connectable to various configurations of the modular handling system to selectively divert cases about the modular handling system to desired transport locations. The modular sorting system may include interconnectable sorters at each of the mobile bases that identify the various mobile bases and wings, and divert the cases therealong to desired locations.

The handling system may have an equipment design intended to provide modularity, flexibility, mobility, size contraction (storage) ability, ergonomic deployability, and/or the ability to be quickly set-up by one or more operators. For example, the equipment may be user friendly, i.e. operated and maintained by workers with little or no training or experience in automated machinery (e.g., workers in store back rooms that may be entry level and/or unfamiliar with machinery). In another example, the handling system may be ergonomic to provide easy assembly such that equipment may be easily lifted, moved, collapsed, and/or deployed by one or more operators.

The handling system may also have an equipment design intended to adapt to a variety of facilities. The handling system may be used with any facility including those having limited manning and/or facility capabilities, such as compressed air and/or power. Installing three phase power or central air system can be costly and may affect an acceptable return on investment (ROI). The handling system may also be used in a variety of backrooms, including those that may be limited in available electrical connections and may have no shop air supply.

In an example, the handling system may be provided with various features to enable the handling system to run on wall current (120 VAC 20 A), to operate without requiring air, mobility (e.g., on wheels), to collapse (e.g., can be broken down folded up and pushed into a corner or outside to make room for stock or other operations), and/or to be configured in various layouts (e.g., to accommodate most any back room layout) and/or a number of sort lanes (e.g., can be increased or decreased simply by moving modules around). The handling system may also be arranged for replaceability (e.g., broken modules can be replaced or removed without effecting the handling system), for modularity (e.g., modules connect to each other with two small simple plug-in connection), for efficiency (e.g., add or take away sort lanes in 5 minutes), for connectability (e.g., sort lanes may be added by plugging in more modules), for low cost operation, for self-programmability, etc. In another example, the handling system may provide a mobile, storable, modular case sorting products that may be used to work in areas available for limited hours in the day, limited space, and/or little or no industrial facilities (e.g., air and three phase power).

The handling system may also have an equipment design intended to adapt to a variety of store operations, including those that may have low margin business and/or may be unable to maintain a large backroom crew on-hand to handle peak loads for receiving, sorting and stocking goods that may affect profits. For example, the handling system may be used to provide backroom automated receiving and sorting that may provide store operations relief and may allow a reduction in labor without losing sales.

The handling system may also have an equipment design intended to enhance inventory and/or flow. For example, the handling system may be used to provide for receiving and sorting automation, and/or to enable distributed logistics in a variety of facilities. Such automation may also be intended to increase product flow at the stores such that, in effect, automation may create cost savings by improving backroom and store stocking efficiency, and/or by moving operations from a regional distribution center (RDC) to the facilities (e.g., stores) where automation may be performed more efficiently with added value.

Handling System Configuration

FIGS. 1A and 1B depict example facilities 100a,b in which the inventive modular handling system 101a,b may be utilized. The modular handling system may be configurable for use in a variety of facilities, such as the facility 100a with a pre-existing fixed conveyor structure 102a as shown in FIG. 1A. Existing fixed structures may be present in a given facility. The modular handling system may be matable with such existing structures.

As shown, the facility 100a is a manufacturing facility with an existing, fixed conveyor structure 102a extending between locations to define a conveyor path (or sort lane) 104 therealong. The fixed conveyor structure 102a includes a frame 106 fixed to the floor (e.g., bolted). As shown, the fixed conveyor structure 102a includes linear and curved portions extending along multiple lines between locations of the facility 100a. While a specific configuration is shown, the fixed conveyor structure 102a may be in any shape.

The modular handling system 101a is removably attached to the fixed conveyor structure 102a. In the example shown, the modular handling system 101a is attached along a portion of the fixed conveyor structure 102a to provide an additional conveyor path 104' to new locations. In the example shown, the modular handling system 101a includes one mobile base 108 and three wings 110, but any configuration of one or more mobile bases 108 and wings 110 may be provided over any distance to any location. The mobile base(s) 108 and wings (110) may be moved to a desired location and connected to any portion of the fixed conveyor structure 102a for use therewith for transporting one or more cases 111 to various locations.

The modular handling system may also be configurable for use in a variety of facilities, such as the facility 100b with a dynamic use area 102b as shown in FIG. 1B FIG. 1B shows an example facility 100b with a dynamic use area 102b that serves multiple purposes. In such cases, the modular handling system 101b may be provided to allow the modular handling system 101b to be moved into the dynamic use area 102b to transport the cases 111, and then moved out of the dynamic use area 102b to permit other functions in the dynamic use area 102b when the handling system 101b is not in use.

In the example of FIG. 1B, the facility 100b (e.g., a retail store or a distribution center) includes a warehouse 112 having a dock 114 with multiple bays 116 and locations L1-6. The truck bays 116 may have trucks (or other mobile units) 118 positioned therein for delivering cases 111 to the warehouse 112. As a truck 118 arrives, the modular handling system 101b may be adapted to provide a desired configuration. Various arrangements of the modular handling system 101b may be provided. The modular handling system 101b may be mobile and reconfigurable to move between bays 116 and/or locations L1-6 as needed.

As shown in FIG. 1B, multiple mobile bases 108 are positioned with multiple wings 110 to extend between the bays 116 and the locations L1-L6. Individual modules (or sections or stations or conveyor stations) of one or more mobile bases 108 with one or more wings 110 may be connected thereto and positioned adjacent other modules to form the overall combination. Such modules of the mobile base(s) and wing(s) of the handling systems may be referred to as modules 120.

As also shown, one or more wings 110 may be collapsible wings foldable to a collapsed position out of the way. The mobile bases 108 and collapsible wings 110 may be stored out of the way, for example to permit movement or forklifts and/or other items about the dynamic use area 102b. The modular handling system 101b may be used in combination with other devices, such as carts, fixed conveyors, etc.

While FIGS. 1A and 1B show specific configurations of a modular handling system 100a,b in specific facilities. It will be appreciated that various facilities may be provided with various configurations of the modular handling system 100a,b. The modular handling system 100a,b is intended for configuration as needed to adapt to the given facility and/or operations. Dynamic use areas (e.g., 102b of FIG. 1B) may be, for example, a retail store or distribution center. The dynamic use area of a retail store may have store back rooms (e.g., warehouse 112) where merchandise and goods are received from trucks and prepared for restock on a retail floor. Back rooms may be like mini distribution centers where stock is received from one or more sources (e.g., trucks 118), stored and distributed to retail areas (e.g., L3).

A trend towards bigger and bigger retail stores may be transforming store back room operations into mini distribution centers. Large retail stores may receive and sort thousands of cases 111 of goods daily. Receiving and sorting cases for various departments may be a manual process if no automation equipment is available that operates under the special conditions and requirements of the store back room.

In an example retail area of approximately 150,000 square feet (13,935 m$^2$), around 5,000 square feet (465 m$^2$) may be dedicated to the back room. The back room may be packed with a rack and shelving to hold stock and consumables used in the store. The available floor space may be around the dock doors and between the storage racks. These areas may have dynamic uses changing with various operations throughout the day. There may be little or no space for permanently installed equipment. New developments in direct to consumer (DTC) business and "tethering" to small stores may put more uses and demand for space into retail store back rooms.

In another example, distribution centers (DC) may also have areas around truck aprons (e.g., bays 116) having multiple uses. Cross docking operations on the case level may require overhead material handling equipment, sorters and conveyor to leave dynamic use space open. In cases where cross dock operations may occur part of the time, permanently installed overhead equipment may be expensive and difficult to justify.

Sustainability movement and cost saving measures among corporations may put an emphasis on floor stacking trucks to maximize the cube space and minimize truck mileage. Cases may be unloaded or loaded by the case, rather than in unit loads (e.g., on pallets). Truck unloading or cross docking operations with floor stacked loads (individual cases) may occur during part of the day as scheduled with truck traffic. Large permanently installed systems may not justify the cost for part-time operations. Permanently installed systems may be installed across many dock doors that get only partial use, as opposed to mobile (flexible) handling system (e.g., 101a,b) that can move to different locations. Various configurations of the modular handling system 101a,b may be used in such applications.

While the modular handling system 101a,b as shown is depicted as a modular and mobile system that may be used in temporary situations, it will be appreciated by one of skill in the art that such systems may be permanently installed. Part or all of the systems (e.g., case conveyor and sortation equipment) may be temporarily or permanently installed.

FIGS. 2A-4C show various configurations of a modular handling system with a mobile base and connectable wing(s). FIGS. 2A and 2B show the modular handling system 201 including a mobile base 108 with a flip-up wing 110. FIG. 3 shows a flexible modular handling system 301 including a mobile base 108 with a flexible wing 310. FIGS. 4A-4C show the modular handling system 401 including a mobile base 108 with the flip-up wings 110 and foldable (or bendable) wings 410.

Figure 2B:
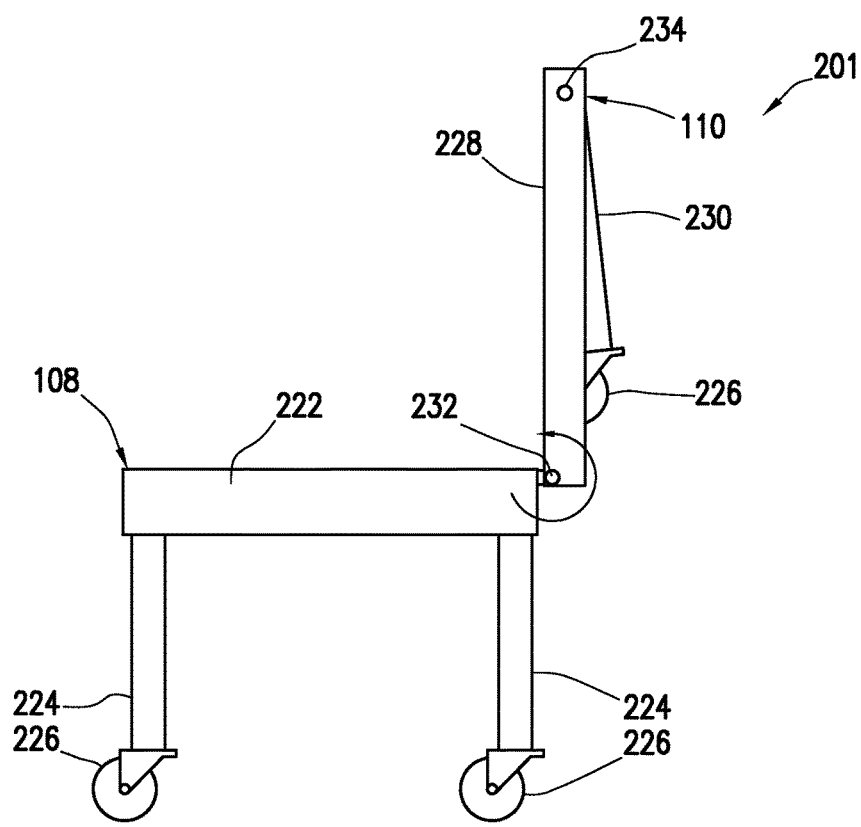

In the example of FIGS. 2A and 2B, a modular handling system 201 is shown in an operational and a collapsed position, respectively. The modular handling system 201 may be quickly positioned in a desired configuration for use as shown in FIG. 2A, and then folded to a collapsed (or storage) position as shown in FIG. 2B.

The handling system 201 may be a module 120 comprised of the mobile base (or central conveyor component) 108, and one or more of the collapsible wings (or transfer or conveyor) 110 connected to an end of the mobile base 108. The mobile base 108 has a frame 222 with legs (e.g., wheeled legs) 224 on wheels (e.g., lockable caster wheels) 226 for mobility. As shown in these examples, the frames 222, 228 may be linear bars in a polygonal shape (e.g., square or rectangular) and capable of supporting transporters 225a,b and legs 224, 230 thereon.

The collapsible wing 110 is provided with a frame 228 with collapsible (e.g., folding) legs 230 therebelow. The frame 228 is pivotally connectable to the mobile base 108 by a leg connector 232 and movable to a collapsed position with the folding legs 230 retracted therealong by base connector 234.

In the example of FIG. 2B, the collapsible wing 110 rotates about the base connector 232 to a vertical position with folding legs 230 pivotally folded along leg connector 234 to a position parallel against the frame 228 as indicated by the arrows. Conveniently, the folding legs 230 may rotate about leg connector 234 and fold under the frame 228. The collapsible wing 110 may also optionally be provided with wheels 226.

The base connector 232 and/or leg connector 234 may be provided with a spring (e.g., torsion spring) 227 to manage the collapsible wings 110 during set up and take down. In an example, the base connector 232 may be a torsional rod, an axel, and/or a spring capable of supporting the collapsible wing 110 as it is movably positioned about the mobile base 108. Ergonomics may be supported with the overall compact design by providing one or more of the springs 227. Such springs 227 may be used to ease the lifting of the collapsible wings 110 during rotation up or down about the base connector 232 and/or leg connector 234.

The various handling systems may be provided with various combinations of structural component materials. The mobile bases and/or collapsible wings may be made of metal, plastic, or other material. For example, a unique combination of steel and aluminum structures may be used to provide weight distribution about the handling system for stability in moving the collapsible wings (i.e., take down, transport, storage, and set-up).

The mobile base 108 may be may be made of a metal, such as heavy steel, to support a substantial weight and provided with a heavy duty construction for durability (e.g., with thicker frames and/or legs). The mobile base may have a steel frame and legs for strength and durability during transport and moving. The heavier construction of the mobile base 108 may provide ballast and stability when lifting, dropping, folding, and/or unfolding the lighter collapsible wings 110. In at least some cases, the mobile base may be considerably heavier than the collapsible wings 110 which may have aluminum frame components. The collapsible wings may be of a lightweight construction (e.g., thinner frames and/or legs) for easy movement to the collapsed position.

In an example, where the mobile base 108 carries the legs, rollers, and other equipment, the mobile base 108 may weigh about 500 lbs (227 kg). Collapsible wings 110 may be made of a lighter material, such as aluminum, for ease of lifting and movement. For example, the collapsible wings 110 may weigh about 40 to about 100 lbs (18-45 kg) or other amount sufficient to support the cases 111 and/or considerably lighter than the mobile base to facilitate manual folding up and down of the collapsible wings.

FIGS. 2C1-2C3 show various view of portions of the handling system 201. FIG. 2C1 shows the mobile base 108 with diverter 225a and collapsible wings 110 with rollers 225b. FIG. 2C2 shows the mobile base 108 and collapsible wings 110 showing the connectors 232, 234. FIG. 2C3 is a detailed view of the base connector 232. These figures depict various views of possible connectors 232, 234 in greater detail.

Various moving mechanisms, such as one or more gravity or power driven rollers, conveyor belts, bands, etc., may be used as the transporters 225a,b to convey cases 111 along various portions of the handling system 201. For example, the transporters 225a,b may be, for example, a diverter (or case transfer) 225a supported on the frame 222 and rollers 225b supported on frames 228. Examples of diverters that may be used are provided in U.S. Patent Application No. 62/053,009, previously incorporated by reference herein.

As shown in this version, the mobile base 108 has multi-directional rollers 225a that allow cases 111 to pass therealong in multiple directions (e.g., to move along different collapsible wings 110) as indicated by the arrows. The collapsible wings 110 are provided with bi-directional rollers 225b that allow cases 111 to pass linearly therealong as indicated by the arrows. The rollers 225b may be rotatably supported on the frames 222, 228 to permit the cases 111 to pass therealong.

The connectors 232, 234 may be a variety of connectors capable of movably connecting the mobile base 108 and/or legs 230 to the collapsible wing 110. The connectors 232, 234 may provide for a fixed, movable, pivotal, retractable, and/or other connection between the collapsible wing 110 and connected components. As also shown in these examples, the leg connector 234 may be, for example, a pivotal connector (e.g., dashpot) including an axel 229, a pivot 231, and a stop 233. The pivot 231 permits the legs 230 to pivot about the frame 228, and the stops 233 may be used to limit movement of the legs 230 to define a vertical and/or horizontal position for the legs 230. Springs, locks, latches, connectors, and/or other devices may also be provided for use with the handling system.

As shown in FIG. 2C3, the base connector 232 may be a pivotal connector between the mobile base 108 and the collapsible wing 110. For example, the base connector 232 may be a torsion bar including a rod 237 with a spring 227 connected to the collapsible wing 110 as shown (or mobile base 108). Base connector 232 may also be provided with a bearing 239 and a bracket 235. The rod 237 may be connected to the collapsible wing 110 and the mobile base such that the collapsible wing 110 may pivot about the mobile base via the rod 237 (or vice versa). The spring 227 may provide a tension between the mobile base 108, the collapsible wing 110, and the rod 237 to restrict movement therebetween. This tension may be used to facilitate lifting of the collapsible wing 110 about the mobile base 108.

The connector 232 may be a torsion bar, spring, or other device that may be used to provide a counter-balance force to help lift the collapsible wing 110 to the collapsed position of FIG. 2B. For ergonomic and safety reasons the collapsible wings 110 may contain a counter weight (e.g., torsion bar counterweight) or spring device to softly lower collapsible wings to the floor during deployment. The counter balance force may also help to prevent the collapsible wing 110 from uncontrolled lifting and/or dropping.

FIG. 3 shows a flexible (or compressible) version of the handling system 301. In this version, the flexible handling system 301 includes the mobile base 108 (as in FIG. 2A) with a flexible wing 310 connected thereto. The mobile base 108 may be connected to one or more of the flexible wings 310 using a base connector 334. In this case, the base connector 334 is a hook latch that removably links the base connector 334 to the flexible wing 310.

The flexible wing 310 as shown extends to a predefined distance, and retracts against mobile base 108 to a collapsed position. The flexible wing 310 may include an expandable frame 328 supported on legs 230 with wheels 226. Additional cross-bars may be added to the frame for support. The expandable frame 328 may include pivotably connected segments 329 to expand and retract in an accordion configuration. Such pivotal connections 329 may also permit the frame 328 to curve and/or to form linear and/or non-linear portions as shown. Examples of flexible wings that may be used include flexible skatewheel conveyors commercially available at www.asconveyorsystems.co.uk.

FIGS. 4A-4C show another example configuration of a modular foldable handling system 401 in various positions. As shown in this version, the mobile base 108 may be connected to multiple collapsible wings 110. In this example, the mobile base 108 is coupled to flip-up wings 110 (as in FIG. 2A) on two opposite sides with the legs 230 folded below frame 228, but could optionally be extended. Foldable wings 410 are connected to two other opposite sides of the mobile base 108 by connectors 434.

The foldable wings 410 each have two wing sections 419 pivotally connected by hinge 417. Each wing section 419 has a frame 428 with legs 430 supported therebelow on wheels 426. The frame 428 has a surface portion 429 and a leg portion 431 with the legs 430 therebetween. Additional cross bars have been added between the legs 430 for additional support. The frame 428 and legs 430 collapse as the wing sections 419 pivot about hinge 417 to a folded (or collapsed) position.

The foldable wings 410 may be separately or simultaneously folded or extended. FIG. 4A shows the foldable wings 410 in an extended position for passing the cases therealong. FIG. 4B shows the foldable wings 410 as they initially bent about hinge 417. FIG. 4C shows the foldable wings 410 as they bend further to reduce an overall dimension of the handling system 401. The foldable wings 410 may be further collapsed such that the wing sections 419 are in a vertical position parallel and adjacent to each other. The flip-up wings 110 may also be flipped up to reduce the dimensions of the handling system 401, for example, when stored or not in use.

FIGS. 5A-7B show various configurations of the modular handling system 501, 701 including combinations of multiple mobile bases 108 and multiple fold-up wings 110 forming multiple connected handling modules 120. FIGS. 5A and 5B show the modular handling system 501 positioned in an operational and a collapsed position, respectively. FIGS. 6A and 6B shows space occupied by the modular handling system 501 in an expanded and collapsed position, respectively. FIGS. 7A and 7B show another modular handling system 701 with a sorting system 744 positioned in an operational and a collapsed position, respectively.

As shown in FIGS. 5A and 5B, the mobile base 108 may be designed to be a mobile base with four sides connectable at each side to wings 110. Wings 110 may be attached to the mobile base 108 with the connections 232, 234 to allow each wing 110 to fold up or down for storage and transportation. As shown by these figures, multiple mobile bases 108 and wings 110 may be quickly positioned in a desired configuration for use, and then folded to a collapsed (or storage) position. The multiple mobile bases 108 and wings 110 form multiple (e.g., four) modules 120, with all wings 110 movable to a collapsed position about the mobile base 108 as shown in FIG. 5B.

The handling system 501 may be shifted from the operational position with each conveyor module 120 having a mobile base 108 with four wings 110 extended thereabout to a collapsed position with each of the four wings 110 of each mobile base 108 folded thereabout as shown in Figure SA. The mobile bases 108 with the wings 110 collapsed thereon are then moved to a collapsed position as shown in FIG. 5B. FIG. 5B shows one module 120 of the modular handling system 501 folded and stored for space savings. One or more of the modules 120, mobile bases 108, and/or wings 110 may be collapsed and stored separately or together. The module handling system 501 may be a self-storing, flexible sort module.

In each of these examples, the mobile base 108 is connected on four sides to wings (or right angle transfers or conveyors) 110 with the ability to transfer the flow of cases 111 at right angles as the case 111 is diverted from the mobile base 108. The multiple modules 120 provide multiple locations for sorting, delivery, and storage of cases 111. Multiple modules 120 may be connected together to form a complex modular system. For example, one or more mobile bases 108 with one or more collapsible and/or non-wings 110 may be abutted together to form a chain of modules 120. While each of the modules 120 are shown as having one mobile base 108 with four fold-up wings 110, any combination of mobile bases 108 and any wings 110 may be provided.

Each wing 110 is optionally supported on an end opposite from the connection with the mobile base 108 with legs 230 to support the wing 110 at a desired height and to increase stability. As shown in FIGS. 5A and 5B, these legs 230 have adjustable feet 540. The adjustable feet 540 may be telescopically connectable to the legs 230 and extendable therefrom for supporting the wings 110 at a desired height relative to mobile base 108. As shown, the wings 110 may be extended at a slight angle θ that lowers away from the mobile base 108 to allow cases 111 to gravitationally slide down the wing 110 as they leave the mobile base 108 as indicated by the arrow. The wings 110 may optionally be provided with a collector 543 (e.g., a bin, box, pallet) to capture and/or offload the cases 111 that reach the various locations.

Each mobile base 108 may have a diverter 236a and may be fitted with various configuration choices of types of wings (e.g., FIGS. 2A-4C) with various types of rollers 236b, such as powered conveyor, gravity conveyor, no conveyor, and/or rollers. The wings 110 and/or rollers may be powered or unpowered, and have the same connection point and method with the mobile base that can be interchanged to allow customization for a particular installation.

In the examples shown the mobile base 108 and wings each have an orthogonal rectangular frame 222, 228 supported on legs 230. While the mobile base 108 is depicted as being polygonal, the mobile base 108 may be of any shape connectable to one or more wings 110 and/or existing systems, such as those shown in FIG. 1A. The mobile base 108 has an end matable with a matching end of the wings 110. While the mobile base 108 is shown with four legs 224 and the wing 110 with two legs 230, one or more legs, and/or various movement devices (e.g., wheels, casters, rollers and/or other devices) 226 may be provided to facilitate transport. The mobile base 108 and/or wings 110 may be sized and/or shaped for connection to a fixed conveyor system 102a as in FIG. 1A, or a corresponding mobile base 108 and/or wing 110.

A width of the mobile base 108 may be matched to the width of the wings 110. For example, the mobile base 108 may be constructed such that all sides are of equal width so that the mobile base 108 is square and the width of each side is approximately the same as the width of the wings 110. In another example, mobile bases 108 may be utilized to channel materials onto a wing 110 of a smaller width. A diverter bar may optionally be provided to steer cases 111 from a larger mobile base 108 to a smaller wing 110.

Frames 222, 228 of the mobile base 108 and wings 110, respectively, may be of any length and have various shapes. In an example, the mobile base 108 and wings 110 may be sized to support one or more cases 111 thereon. As shown, the wings 110 have a length about double a length of the mobile base 108, but may be of any length. In the example of Figure SA, two different types of wings 110 are provided with different dimensions. Stop bars 541 are provided on the lateral wings 110 to catch the cases 111 gravitationally deployed from the mobile bases 108.

The specific widths along the handling system may be customized to meet the needs of a specific application. The mobile base 108 may have a polygonal conveyor surface interfacing with one or more wings 110 of two (or double) widths. A wider dimension may be used to accommodate case flow with a long side leading. A shorter dimension width may be used for cases 111 traveling longitudinally or with the short side leading the direction of travel (e.g., passing through the mobile base).

In the example of FIGS. 5A and 5B, the wings 110 are right angle transfers and the mobile bases 108 are case conveyors designed to operate with drivers (e.g., low voltage motors) and eliminate the need for air power to provide mobility, flexibility, ease of storage and deployment. The handling system may be operated with or without power or air supply. To power the handling system, small electrical plug connections may be made after the wings are attached allowing the distributed controls to recognize the wing and if it is powered or gravity as is described further herein.

FIGS. 6A and 6B show an alternate, schematic view of the handling system 501 of FIGS. 5A. and 5B. As demonstrated by these figures, the handling system may expand to an operational position when needed as in shown FIG. 6A, and contract to a collapsed position to take up less space when not in use as shown in FIG. 6B. This view shows example dimensions of the handling system 501 in the operational and collapsed positions, respectively. In the operational position of FIG. 6A, the system has an operational width Wf and length Lf with an overall operational area Af. In the collapsed position of FIG. 6B, the system has a collapsed width Wf' and length Lf' with an overall collapsed area Af'.

In this example, the dimensions of the handling system 501 in the operational position of FIG. 6A are about 10.5 feet (3.2 m) by about 37 feet (11 m) for a total floor area of 388.5 square feet (36 m$^2$). Once collapsed, the handling system 501 collapses (or compresses) to a dimension of 6 feet (1.8 m) by 8 feet (2.4 m) for a total of about 48 square feet (4.5 m$^2$), or about ⅛th of its original size and about an 88 percent reduction in floor space requirement. In other words, the handling system may contract to take up about 12% of its original operating floor space when stored.

FIGS. 7A and 7B show another example view of the modular handling system 701 in an operational and a storage position, respectively. These figures show the modular handling system 701 with cases 111 distributed by the handling system 701 and handled by operators 742. The handling system may be manually and/or automatically operated by one or more operators (or no operator) 742.

As shown in FIG. 7B, the handling system 701 has mobile bases 108 with fixed wings 110' on two sides and fold-up wings 110 on two sides thereof. In this configuration, the fixed wings 110' along a main portion of the handling system remain extended, and the fold-up wings 110 extended laterally from the main portion and on opposite sides thereof fold up to a collapsed position.

As shown by this version, the modular handling system may be provided with optional features. For example, the modular handling system 701 may be provided with a sorting system 744 supported on the handling system 701 by a bracket 746. The sorting system 744 may be provided with a sorter 748 to selectively divert the cases 111 along the handling system 701 to a desired location. One or more sorters 748 may be positioned about one or more portions of the handling system 701. For example, one sorter 748 may be positioned at each module (or mobile base), or one sorter 748 over multiple modules (or bases).

The sorting system 744 may also be provided with a power supply 753 for powering the sorting system 744 and/or the handling system 701. The power supply 753 may be connectable to existing wall outlets on wall current (e.g., 120 VAC 20 A). The handling system may be provided with an electric design. The electrical system may be used without hydraulics and eliminate the requirement for air. This may add to the mobility and flexibility of the sorter. The handling system 701 can be used in areas where no air supply is available and without regard for the amount of air required to support the number of sort modules.

The sorting system 744 may include automated sorting equipment commercially available on the market and modified for use on the modular handling system. Components of the sorting system 744, such as scanner 750, or sorter 748, may be connectable to the mobile base 108 and/or wings 110 of the handling system 701 by the bracket 746.

In another example, the handling system 701 may also be provided with a cutter 752 with automatic and/or manual box cutting capabilities. The cutter 752 may be used with the sorting system 744 to cut cases 111 identified by the sorter 748. The cutter 752 may be outfitted (e.g., as a bolt-on option) with automated box opening technology to precut cases 111 sealed with tape to allow easy opening without dangerous cutting tools. An example box opening apparatus that may be used is provided in U.S. Patent Application No. 61/778,202 entitled Innovation for Automated Box Opening Apparatus, the entire contents of which is hereby incorporated by reference herein.

While FIGS. 1A-7B show specific examples of handling systems, conveyor sections, mobile bases, wings, and/or other components, it will be appreciated that various combinations of the features shown may be provided, and variations in shape, length, and/or dimension may be provided. Multiple modules of one or more mobile bases and wings may be connected to form a desired configuration. Part or all of the bases may be mobile (or not) and part or all of the wings may be collapsible (or not). One or more mobiles may be connected by a connector (e.g., a latch connector) or abutted together to form a chain and/or grid of modules.

Depending on the space and use requirements, various versions of the mobile base and collapsible (e.g., the flip-up, flexible, and/or foldable) wings may be used. These options may provide desired functions, which may affect the functionality for set-up and take-down. Some versions may have more or less difficulty in assembly and/or may be more or less time consuming. The handling system and/or sorting system may be permanently and/or temporarily installed when cost effective to justify its full and/or part time use.

Additionally, selected versions may increase or decrease the foot print of the stored system. The desired combinations of features may be selected to achieve the desired results for a given application. The modular handling system may be transient and/or temporary, and/or may use manual labor aided, for example, by flexible conveyors on wheels (e.g., flexible wing 310 of FIG. 3), forklifts, carts, or other aids.

Sorting

FIGS. 8A-11B show various examples of sorting using the modular handling systems and the sorting systems as provided herein. As shown by these figures, the sorting system is modularly connectable to the modular handling system to selectively sort and transport the cases to a desired location. The sorting systems provided herein may be used with mobile and/or fixed handling systems.

FIGS. 8A and 8B shows an example configuration of the sorting system 744 connected to a modular handling system 801. As shown in FIG. 8A, the modular handling system 801 includes mobile base 108, wings 110, and sorting system 744. The wings 110 form a linear path 804 from an initial location L0 past mobile base 108 to location L1. The wings 110 extending laterally from the mobile base 108 to define paths 704', 704" to locations L2, L3, respectively.

The sorting system 744 includes one or more of the sorters 748 and communication links 754. The communication links 754 may connect one or more components, such as connecting together multiple the sorters 748 to other sorters, power supplies 753, and/or one or more HMIs 758, for passage of power and/or communication therebetween. Each sorter 748 may include a scanner (or receiving scanning module) 750, a power supply 753, processor (or central processing unit) 756, and a Human Machine Interface (HMI) 758.

The scanner 750 may include a camera and a mount to identify cases passing along the handling system 801 (e.g., on intake). The scanners 750 may be, for example, photo-optic sensors, photo switches, or cameras, used in a standard zero pressure accumulation zone control and/or mounted at various locations about the handling system 801 to detect, locate, and/or identify cases 111 passing thereby. These scanners 750 may indicate when a case 111 enters or leaves a portion of the handling system 801.

The sorter 748 may be used to selectively divert the cases 111 along the handling system 801 to a desired location. The processor 756 may include logic, database, transceiver, controller, and/or related software and hardware powered by the power supply 753, and capable driving the handling system 801 to divert cases 111 to desired locations L0-L3. The processor 756 may be, for example, a distributed computing system including a plurality of processing units connected by a communication network. The sorter 748 may be coupled to or include drivers to advance the cases ill along the mobile base 108 and/or wings 110, such as the diverters 225a of the mobile base 108 and/or the rollers (e.g., power rollers) 236b of the wings.

The HMI 758 may be, for example, one or more printers, monitors, mouse, scanners, etc., 758 and/or other components. The HMI 758 may be used as an interface between operators and/or the sorting system 744. The HMI 758 and/or portions of the sorter 748 may be located at the handling system 801 or a distance therefrom.

Each module 120 of the handling system 801 may have its own sorting system 744 (or portion thereof) connected by sorter connectors 759. As shown, the sorter connectors 759 couple links 754 of adjacent sorting systems 744. Part or all of the sorting systems 744, such as the HMI 758, along one or more handling systems 801 or portions thereof may be shared. For example, each mobile base 108 may have its own scanner 750, sorter 748, and/or other components of the sorting system 744. The mobile bases 108 may interactively operate based on cooperation between the sorters 748 of the mobile bases 108. Interactive operation provides for tracking of cases from one module of the handling system 801 to another. As shown, Tracking may also be used with individual sorters 748 (and/or processors) at each module to passes info between interlinked sorters. Tracking may also be used with a single sorter 748 and/or processor that monitors the case and sends signal back a base controller as it passes to new zones.

Tracking may be manipulated using various techniques, such as Zero Pressure Accumulation (ZPA) and/or other zone tracking. ZPA refers to a method by which cases are accumulated and/or passed individually from one zone (e.g., a portion of the module, or the wing 110) to another zone without touching another case. ZPA may be used to track the location of a particular case as it moves from zone to zone.

The sorter 748 is operatively connected to drivers of the handling system 801, such as powered rollers 236a and/or 236b and/or associated drivers. In the example shown, powered roller 236b is a bi-directional roller along wings 110 that advances the cases 111 linearly along the path 704, and the powered rollers 236a are bi-directional rollers that may divert the rollers linearly along path 704 to location L1, or laterally (at a right angle) to paths 704' or 704" along lateral wings 110 to locations L2 or L3. The sorter 748 may be operatively connected to the powered rollers 236a,b to selectively activate such rollers to advance the cases 111 along the desired path(s).

The sorter 748 may be connected to the handling system 801 to drive one or more of the movement mechanisms (e.g., diverters and/or rollers) of the handling system 801. The handling system 801 may have a flexible powered conveyor used, for example, to facilitate case movement in the dynamic use areas. The sorting system 744 may be a Transient Modular Storable Case Sorter (TMSCS) that uses drive rollers (or conveyors and/or diverters) 236a, 236b to move a flow of cases 111 to various paths (or sort lanes) to sort (e.g., divide and organize) cases 111 for distribution to a given location, such as departments, stocking areas, stores or trucks.

Automated equipment may be used for sorting functions. For example, a TMSCS may be targeted for use in the dynamic use areas (e.g., back rooms of large retail stores and distribution centers where there may be a need to install, breakdown and relocate automated sorting systems one or more times per day). The handling system 801 may include features allowing for first time mobile, reconfigurable, and/or storable case sorting automation to viably function in dynamic use areas.

The sorting system 744 may be provided with various options. For example, a Receiving Scanning Module (RSM) may be equipped with a printer applicator (or label maker) 860 for the purpose of adding labels 862 to the case 111. The labels 862 may provide a unique identifier with information about the case 111 that may be updated as the case passes through the handling system 801. The label data may be, for example, a quick response (QR) code (or barcode) containing location information allowing the use of indoor location technology or simply column, aisle and shelf information.

The components of the sorting unit 744 may be combined or separate. The sorting system 744 and/or components thereof may be modular for connection and use with the modular handling system 801. For example, multiple sorters 748 and related links 754 may be coupled together in series to form a chain of sorters 748 and links capable of identifying the cases 111 as they pass along portions of the handling system 801. In this manner, with each added module 120, a sorter 748 may be coupled to the existing handling system 744 for operation therewith.

As shown, the communication links 754 include communication lines (e.g., Ethernet) and power lines. The sorting system 744 may use a variety of communication links 754, such as a simple interconnection scheme. Modules may be connected to each other by two simple connections of 120 Vac power and Ethernet network. Standard low cost wiring, sockets and plugs are available for a simple easy to use and robust connection between modules. The HMI 758 may be located remotely and communicate with the sorters 748 (e.g., controller in the scanners).

The sorters 748 may have databases to store data concerning the cases 111 and/or the handling system 801. The data may optionally be discarded. The information being passed between embedded electronics of each sorter 748 of each of the modules 120 may be relatively small, and the speed of electronic communication capabilities may exceeds the physical transport capabilities of the packages on the conveyors. Therefore, in an example, non-contact communications such as infrared (IR) emitters and photo receivers may be incorporated into the ends of wings to pass communication between the embedded electronics of each sort module. In another example, short range wireless communications may be utilized between the modules. Line of sight communication means, such as the IR emitters and photo receivers, may provide a break in communication that can signal a misalignment of a conveyor and allow a system shutdown to prevent sending packages off the end of the handling system onto the floor.

One or more sorting systems 744 may be connected to the handling system 801 and integrated for cooperative operation. The sorting system 744 may be integrated with logic that permits the individual sorting systems 744 to identify the cases 111, and hand off the information to adjacent sorting systems.

The cases 111 may be scanned by scanner 750 as they pass along the zones of the handling system 801. Once scanned, the scanner 750 may determine a location for delivery of the cases 111. The cases 111 may advance linearly along path 704 of the handling system 801 until diverted by the movement mechanisms (e.g. diverter 236a and/or rollers 236b) to a different direction, such as along wings 110 at right angles to the lateral paths 704', 704". As cases 111 passes over the mobile base 108, the case 111 may be diverted to take path 704' or path 704" of the handling system 801. The cases 111 may be transferred in a straight line (uni-directionally) along path 704 or moved along the right angle wings in another direction (bi-directionally) along paths 704', 704". The movement mechanisms may be uni-directional and/or bi-directional to provide case movement in at least one of four possible directions or east, west, north and south.

FIG. 8B is a schematic diagram operation of the sorting system 744. As shown in FIG. 8B, the sorting system 744 is coupled to a mobile base 108 and corresponding wings 110. The wings 110 may be existing wings 110. New wings 110" may also be considered for connection to the mobile base 108.

As shown in this view, the sorting system 744 is self-configuring by detecting portions of the handling system 801, such as mobile bases 108 and wings 110. The sorter 748 may also identify equipment configurations (e.g., direction, location, dimension, type, etc.) and case identifiers (e.g., type, size, destination, etc.) The sorter 748 may be self-programming with logic that detects components as they are added to the handling system 801 and coupled to the sorting system 744. The sorter 744 (and/or its control system) may be capable of recognizing physical changes in the layout and accommodating the changes by automatically configuring control software to adjust operations.

The handling system may provide for complex configurations. Sorting modules may be configured to handle case flow for different configurations dividing cases over different sortation trunks. No central controller may be required. The combination of case specific sort data and distributed hardware configured controls may allow for larger configurations. Each module's configuration may be recognized by the wings connected (see e.g., FIG. 8B). Wings may be recognized by the unique electrical configuration of each wing (i.e. powered zone, gravity conveyor or no conveyor). Configurations and case flow may be recognized when connections are made to other modules. Connections between modules may be made through the sorter connectors 759 provided for linking sorters of each modules together at the ends of the adjacent wings 110 between modules 120.

The sorting system 744 provides flexibility which allows operators to accommodate various requirements on a dynamic use loading dock, such as the facility of FIG. 1B. For example, different kinds of wings used with the mobile base may be detectable and identifiable to map the structure of the handling system 801. A change in a sort pattern order of the handling system 801 may be accomplished by physically rearranging the mobile bases 108 and wings 110 and the associated sort lanes, and by reconfiguring portions of the handling system (e.g., modules) to a particular material handling task.

As modules of the handling system are connected, the modular sorters are connectable by the sorter connectors 759 to adjacent modules. The changes may be recognized by the sorter 748 (e.g., controls and logic) and automatically created to accommodate the flow change indicated by changes in the hardware configuration of the handling system 801. With this control scheme, new sort modules 110" (FIG. 8B) can be added to the line anywhere without requiring changes the system programming. All that is required is to add the new sort criterion for that module. Theoretically, from a controls logic stand point, almost an unlimited number of components (e.g., wings, bases, and/or sort modules) can be added because the sorters 748 are distributed and as the module number grows so does the number of memory locations.

A particular module 120 of the handling system 801 can be assigned to receive a group of cases of a specific designation (or type). If the module 120 is physically moved, the cases of the given designation may also be diverted. The logic may be assigned to follow the physical location of the module 120 and its associated sorters 748. This may be used to facilitate changes required by the operators without requiring interaction with the operator (e.g., by the HMI 758) or the expertise and training needed to do so.

The sorting system 744 may be provided with software having Self Recognition and Automatic Configuration. The control architecture may be distributed. All operating logic may be contained within each sorter 748 to operate moving mechanisms (e.g., rollers and/or diverters) of the handling system 801.

As shown in FIGS. 9A1-9A4 and 9B, each module has a unique identity with sort lanes L and R for passing cases 111 therealong. Each configuration of each wing and/or mobile base location, power, gravity, size, dimension, etc. may be identified. Direction of the handling system such as the multi-direction diverter of the mobile base and the bi-directional and/or uni-directional rollers of the wings may also be identified as indicated by the arrows.

As shown in FIGS. 9A1-9A4, the wings 110 may be configured about a mobile base 108 with bi-directional flow in various directions about mobile base 108 and/or for collection of cases 111 thereon. FIG. 9A1 shows three wings 110 connected to the mobile base 108. FIGS. 9A2 and 9A3 shows two wings 110 connected to the mobile base 108, and one wing 110 to collect packages 111. FIG. 9A4 shows two wings 110 connected to the mobile base 108, and two wings 110 to collect packages 111.

Figure 9B:
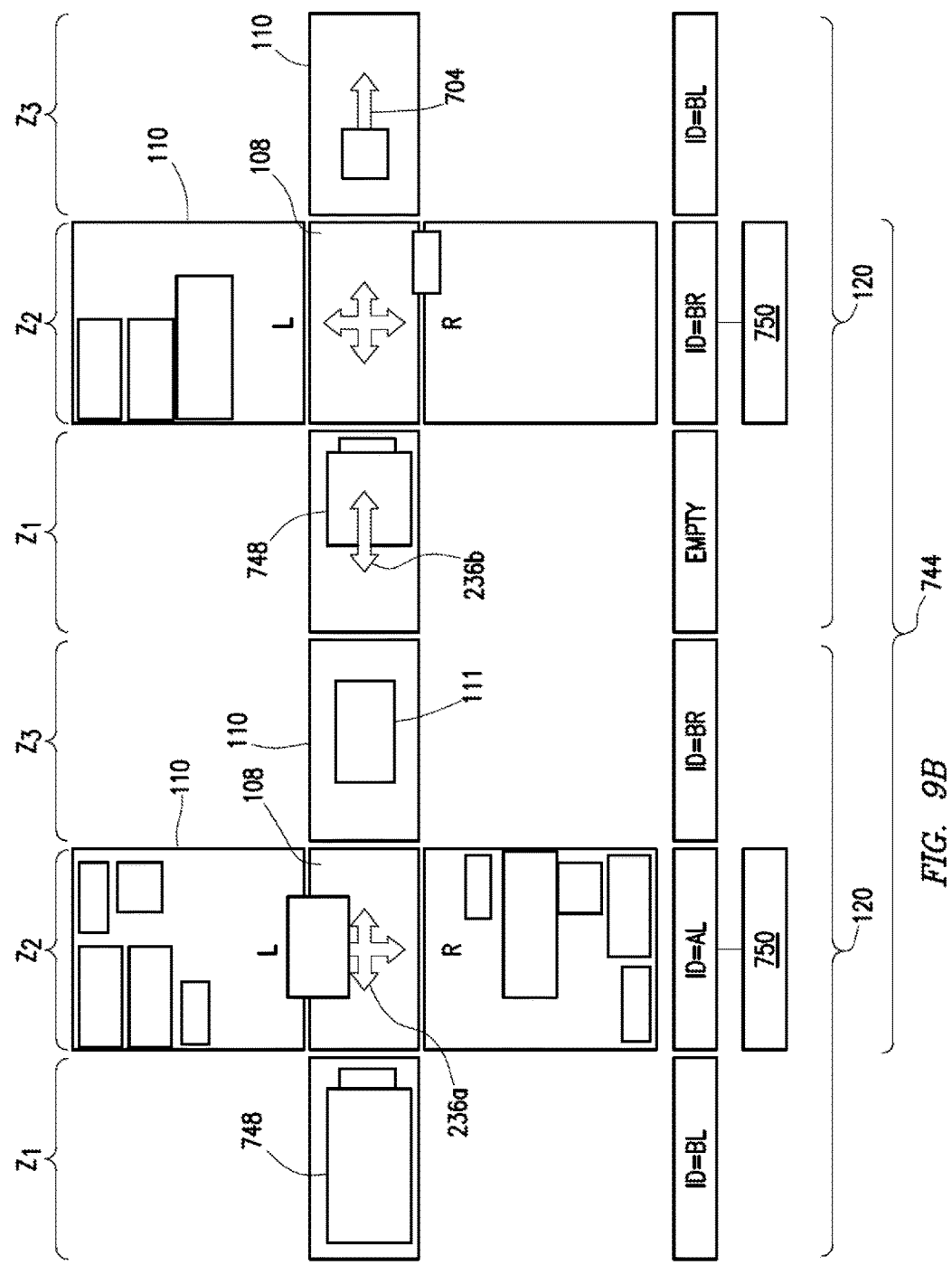

As shown in FIG. 9B, each case 111 may be identified by the sorter 748 and assigned a destination module and path (or sort lane). In the example shown, the handling system includes multiple modules 120, each module having a mobile base 108 with four wings 110 coupled to the sorting system 744. The sorting system 744 includes sorters 748 coupled to each module 120.

Each sorter 748 may identify each module 120 and corresponding zones Z1-Z3 in the modules 120. The scanner 750 may identify the case 111 as it passes into the modules 120 and the sorter 748 may activate rollers 236*b* and/or diverter 236*a* to divert the cases 111. For example, the sorter(s) 748 may advance the cases 111 linearly along the main path 704, or turn L or R to lateral wings.

As each case 111 moves from one module (or sort module) 120 to the next, the assigned location destination travels with the case position updating control memory registers in each module, similar to a fire bucket brigade. Each module updates with the progress of the case 111 through the handling system (or network).

A case 111 arrives at its destination module entering a first zone Z1 before the sort zone Z2. Upon entering the sort zone Z2, the case 111 is diverted to the left L or right R depending on the sort instructions carried with the case 111. This functionality can be further enhanced with tetrised stacking as explained further herein. Cases 111 entering and leaving modules 120 and/or zones Z1-Z3 are detected by the sorter 748.

Upon arrival of a new case 111, the receiving sorter 748 may read information about the case 111, such as the case identity, and communicate with the sorting system 744 (e.g., Warehouse Management System (WMS) computer) with the HMI 758 and with the sorters 748. The location of receiving scanner 750 in relation to other modules in the scanning system 744 may signify upstream case flow or the origin of cases 111 into the handling system 701. All other modules may be downstream in order from the receiving scanner 750.

The case is identified at the intake (e.g., scanner zone) when inducted into the sorter system 744. The case identification is cross matched with a table of sort designations as specified by the user. The sort designation BL (e.g. sort module B to the Left) is passed as the case travels from zone to zone and from sort module to sort module. When the case 111 arrives at the sort module the controller for that sort module takes the designation data passed along with the box and compares it with its designated name (i.e. A, B or C etc.) If the case sort designation passed matches, the case is stopped and diverted ether left of right depending on the designation L or R. If the case sort designation does not match the case continues on. If the sort module is configured to branch with sort designations in more than one direction the controller will divert the case to the branch that contains the sort designation with that case.

The controller in the branch sorter knows the names of all sort destinations on each branch because of the network connection for that controller to each branch. In other words the controller in the base unit at the branch can see the sort designations in each direction of the branch and therefore will know which direction to send the case. Examples of the designations include identifiers (ID) of BL, AL, BR, and empty as shown in FIG. 9B.

FIGS. 10A and 10B show another view of a portion of the handling system 701 and scanning system 744. As shown in FIGS. 10A and 10B, cases 111 may be manipulated for compact placement along the handling system 701. By placing cases 111 in a compressed pattern, additional cases 111 can be accumulated without adding length the accumulation wings 110 at the sort modules. This may be accomplished with logic in the control of the sorting system 744.

For example, sorted cases 111 may be accumulated on a non-powered gravity fed accumulation wing 110. Cases 111 may be sorted off the main path 704 in right angles or ninety degrees to the original flow. The cases 111 may be pushed onto the gravity wings 110 with the long side leading the direction of travel. Cases in some applications, such retail stores, can be of many different lengths. Additional case accumulation may be possible if shorter cases ill can be accumulated end to end and side by side.

Lengths of cases 111 can be estimated by the time it takes to pass by the scanner 750 (e.g., zone photo switch) as the cases 111 move into the previous zone. Logic may compute if the cases 111 can fit end to end on the accumulation wing 110. The cases 111 may be fitted end to end by controlling when the cases 111 during the longitudinal flow are diverted sideways onto the accumulation conveyor. A medium size case may be sent to the maximum forward position and transferred leaving some space behind the case for a small case. If the next case is small, it may be transferred early to fill the space behind the medium length case. If the next case will not fit, it too may be indexed forward to make room for a medium or smaller box.

Flow of cases 111 can be received from any of the four directions and passed in any or the four directions. Right angle transfers may not turn cases, though a rotational (or other) component could be added to the module if desired giving the ability to re-orient cases as it crosses the sort module. The direction of travel of the case 111 changes as does the leading face (short or long). This may allow the position of the case 111 to be directed so that cases 111 are oriented in a desired position or direction.

The handling system may also have Stock Location Assistance capabilities. Large stores may have numerous departments and tens of thousands of items. Keeping up with the location of all stock can take weeks even months for stocker new to the position. Stocking efficiency may slow until the store is learned. Stocker positions may be high turnover meaning at some given point there is one or more stocker learning the store. The label 862 may be applied to each case 111 and contain information concerning the stock location in the store by various locating means.

The handling system 744 may also be provided with case Specific Sort Data (operational controls). As each case 111 is scanned, it may receive sort information that travels with the case as it progresses through the various sort lanes. This scheme allows the path for that case 111 to be moved and rearranged without programming. The case 111 travels through the paths until its identification (ID) matches with the path and is diverted (sorted) off the main line. Regardless if path is first or in the 50th position, the case 111 may be diverted at the corresponding sorter 748.

Case tracking may allow the detection of removed cases 111. If a case 111 falls off the line or is removed by an operator, that case 111 may be removed with the sort instruction. The next case 111 may have a sort instruction assigned and may not use the instruction on the case 111 removed. Such instructions may be provided in a similar manner as with open loop case tracking controls. This capability may be made possible by the use of a zoned conveyor using, for example, standard industry practice. Cases 111 may be moved from zone to zone as indicted by activation and de-activation of the scanner 750 as cases 111 pass. For example, one or more cases 111 at a time may be allowed to a zone.

FIGS. 11A and 11B depict a handling system 1101 with multiple modules 120 with multiple wings 110 and mobile bases 108. Each module 120 of the handling system 1101 may have three conveyance zones Z1-Z3 with the middle zone Z2 for the mobile base 108 with diverters 236a (or rollers or (right angle transfers). Cases 111 may flow in one direction from the sorters 748 down through the various sorters (i.e., A, B, C in the example).

The three zones Z1-Z3 in the module 120 in order of case travel are Z1, Z2, and Z3, respectively. As cases 111 may pass between zones Z1-Z3 of one module 120 to zone Z1 of the next module 120, the case sort data is passed to the next sorter 748 in the next module. The case may be tracked through the zones and passed on to the next module control if not diverted for a sort (i.e. controller data at bottom of example diagram).

As the case 111 arrives at the sort position (Z2) the sorter 748 makes a logical decision to sort the case 111 left or right or pass through based on the case sort data or label virtually traveling with case 111 in the sort modules controller memory. This control scheme facilitates flexibility in physically reconfiguring the sorter system without programming changes or controller issues. This control scheme may be used, for example, to add or take away sorting lanes (sort modules), change order of sort lanes (sort modules), increase the number of sort lanes without regard for controller memory, number of I/O or scan time, scale controls (adding sort modules in effect adds controllers), and/or eliminate requirements for customized controls. The programming may have a requirement to assign the sort criterion to the module 120, sort assigned to hardware, and/or logic contained within a module 120.

The handling system may also provide distribution in a complex system and orientation of case specific sort data. When a complex configuration is detected by the sorting system, e.g. one that has more than a single flow line for packages, communications between modules may allow upstream sorters 748 to identify the downstream sorters 748 from one of their directions. This allows an upstream sorter 748 to send packages down the correct path to ensure it reaches the correct destination.

EXAMPLE

In the example of FIGS. 11A and 11B, as a case 111 enters the handling system 1101 at position F, it may be routed up to E, across to G, or down to J. The sorting system 744 knows where each sorter 748 lies in the sorting system 744. F knows that any case 111 for A-E is passed up, any case 111 for G-I is passed across, and any case 111 for J-N is passed down. This may be accomplished by having each module 120 identify its neighboring module 120. A module 120 can determine when it is abutted by another. Modules, such as A, can identify that a module 120 exists to its right (B) and below it (E). Modules 120 with only one neighbor (D, I, N) may identify themselves as a terminal unit (i.e. the end of a line).

The module 120 then notifies its neighboring module 120 of what type of case 111 it is watching for (e.g., D1, D2, D3) which go to each of its three out-feed wings 110 at D1, D3. Module 120 at C, watches for cases 111 of types C1 and C2 which are routed to one of Unit C's two side out-feed wings 110 at C1 and C2. Unit C now also knows all cases D1, D2, and D3 are to be passed across to the third out-feed table to Unit D.

Continuing in this manner, Module 120 at B, watches for package types (B1 and B2) which are routed to one of Unit B's two side out-feed wings 110 at B1 and B2. Unit B also knows all cases C1, C2, D1, D2, and D3 are to be passed across to the third out-feed table to module C. Similar procedures throughout the rest of the handling system 1101 ensure that once fully oriented: Module 120 at F is configured to pass up to Module 120 at E all cases labeled for placement at locations A-E.

Module 120 at location F is configured to pass across to module 120 at G all cases 111 labeled G-I. Module 120 at location F is configured to pass down to module 120 at location J all cases 111 labeled J-N. If for some reason modules 120 at locations I and N are swapped, then the sorting system 744 would orient so that module 120 at F is configured to pass up to module 120 at E all packages labeled A-E. Module 120 at F is configured to pass across to module 120 at location G all cases 111 labeled G-H &N. Module 120 at F is configured to pass down to module 120 at J all cases 111 labeled I & J-M.

The handling system 1101 and sorting system 744 as shown in FIGS. 11A and 11B may be designed for a rate of about 30 cases per minute. In some cases, this configuration may not be suitable for sorting or case at rates beyond 30 CPM. In some cases, the handling system and/or sorter may be configured for additional capabilities.

The handling system 1101 is also provided with distributed networked controls. Each sorter 748 may store information about its sort criterion to compare with the sort data carried with each case 111 coming through that sorter 748. This sort criterion may remain with that physical module until reassigned through the HMI 758. The sort criterion may be kept in the controller memory when power is off or the sorter 748 is disconnected and stored.

Various means are available to label various paths (or sort module lanes) for storage and later set up. Attaching a placard in a placeholder slot labeling the sort lane or color coding with tape are examples. An option may be available to electronically display the sort assignment on the module. Example assignment labels may include: truck Bay 14, ladies department aisle 8, regional store 82, etc. The order or physical arrangement of the sorts can be changed, added to, and/or shortened without requirements for any programming changes.

Dedicating modules to a particular sort criterion may also allow the modules 120 receiving the sorts to be configured for the volume or lack of associated with a particular sort. The control logic may allow workers at any level (e.g., entry level workers with very little training (e.g. dock workers, stockers)) to configure the system functions by simple arrangement of physical components. No interaction with a computer may be required to break down change and reconfigure this innovation for different case flow and sorting arrangements. This function may be combined with the ergonomic modular components specifically designed for easy physical break down, movement and reassembly as described in FIGS. 1A-6C.

The handling system 744 may also be provided with methods for repair or service. If a module 120 is damaged or does not operate correctly, the complete module 120 can be removed and replaced. The replacement module 120 can learn the sort assignment of the replaced module 120 from the module 120 in the handling system 1101 before or after the replacement position in the line.

The handling system may also be provided with store stock location assistance. Locating technologies may be used to help shoppers and workers navigate through large department stores. For a stocker to benefit from such locating technologies the stock item may be recognized and cross referenced to the store map. This capability may be provided with the receiving control cross referencing the scanned case with the product stocking map and printing a location code on the case.

FIG. 12 depicts a method 1200 of handling cases (e.g., transporting cases about a location). The method involves 1290—assembling a handling system. The assembling may involve connecting at least one mobile base and at least one wing between the locations. The assembling may also involve 1292—movably positioning at least one mobile base about the workspace (each of the at least one mobile bases comprising a base frame with a base diverter thereon and the base frame supported by wheeled legs), and 1294—selectively configuring a conveyor path about the workspace by operatively connecting at least one wing to the at least one mobile base (the wing comprises a wing frame with wing rollers thereon and the wing may be a collapsible wing comprising a wing frame supported by collapsible legs).

The configuring 1294 may involve operatively connecting at least one folding module to at least one base module and/or operatively connecting at least one base module and/or at least one folding module to an existing conveyor. The selectively passing 1297 may involve identifying the cases, identifying the at least one destination, monitoring operating conditions (e.g., traffic, quantity, etc.), determining a path along the conveyor to the at least one destination based on the cases and a predetermined destination, selectively diverting each of the cases to a selected one of the at least one destinations, and selectively adjusting 1298 the path based on the operating conditions. The collapsing 1299 may involve disassembling at least a portion of the handling system, and lifting, flexing, and/or folding the collapsible wing to a collapsed position.

The method 1200 continues by 1296—sorting the cases by scanning the cases and defining a route about the conveyor path based on the scanning, and 1297—passing the cases about the route. The passing may involve identifying the cases, the destination, monitoring operating conditions (e.g., traffic, quantity, etc.), determining a path along the conveyor to the at least one destination based on the cases and a predetermined destination, and/or selectively diverting each of the cases to a selected one of the at least one destinations.

The method may also involve 1298—selectively adjusting the path based on the operating conditions and/or 1299—storing the handling system by collapsing the wing(s) about the mobile base The method may be performed in any order and repeated as desired.

While the subject matter has been described with respect to a limited number of embodiments, those skilled in the art, having benefit of this disclosure, will appreciate that other embodiments can be devised which do not depart from the scope of the subject matter as disclosed herein. Accordingly, the scope of the invention should be limited only by the attached claims.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and/or other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

The above description is illustrative of the preferred embodiment and many modifications may be made by those skilled in the art without departing from the invention whose scope is to be determined from the literal and equivalent scope of the claims that follow.

While the embodiments are described with reference to various implementations and exploitations, it will be understood that these embodiments are illustrative and that the scope of the inventive subject matter is not limited to them Many variations, modifications, additions and improvements are possible. For example, various combinations of one or more mobile bases, wings, and/or sorters may be combined to provide a desired conveyor path between two or more locations with manual and/or automatic operation.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A modular handling system for transporting cases between locations, the handling system comprising:
   at least one mobile base comprising a base frame with a base diverter thereon, the base frame supported by wheeled legs; and
   at least one collapsible wing comprising a wing frame with wing rollers thereon and collapsible legs, the wing frame operatively connectable to the at least one mobile base, the wing frame having an operational position with the wing frame supported on the collapsible legs and a collapsed position with the at least one collapsible wing collapsed about the mobile base and the collapsible legs folded about the wing frame, the at least one collapsible wing having a smaller floor area when in the collapsed position than when in the operational position, whereby a configurable conveyor path is movably positionable about a work space;
   wherein the at least one collapsible wing comprises a fold-up wing pivotally connected to the base frame; and
   wherein the collapsible legs comprise wheels.

2. The handling system of claim 1, wherein at least one other of the at least one collapsible wing comprises a flexible wing laterally extendable from the mobile base.

3. The handling system of claim 1, wherein the base diverter comprise multi-directional rollers.

4. The handling system of claim 1, wherein the wing rollers comprise at least one of bi-directional rollers, powered rollers, gravity rollers, and combinations thereof.

5. The handling system of claim 1, wherein the at least one collapsible wing is lighter than the at least one mobile base.

6. The handling system of claim 1, wherein the at least one mobile base is polygonal.

7. The handling system of claim 1, wherein the at least one mobile base comprises a rectangular base with four sides and wherein the at least one collapsible wing comprises four wings, each of the four wings pivotally connectable to one of the four sides.

8. The handling system of claim 7, further comprising at least one non-collapsible wing.

9. The handling system of claim 1, further comprising a base connector operatively connecting the wing frame to the base frame.

10. The handling system of claim 9, wherein the base connector comprises at least one of a torsion rod, axel, and a spring.

11. The handling system of claim 1, further comprising a wing connector operatively connecting the collapsible legs to the wing frame.

12. The handling system of claim 11, wherein the wing connector comprises at least one of an axel, a pivot pin, and a stop.

13. The handling system of claim 1, wherein at least one of the at least one mobile base and the at least one collapsible wing is operatively connectable to a fixed conveyor system.

14. The handling system of claim 1, further comprising a sorting system operatively connected to the at least one mobile base.

15. The handling system of claim 14, wherein the sorting system comprises at least one sorter, each of the at least one sorters operatively connected to a corresponding one of the at least one mobile bases, the at least one sorters coupled by communication links.

16. The handling system of claim 15, wherein the at least one sorter comprises at least one scanner, processor, power supply, and human machine interface.

17. The modular handling system of claim 1, further comprising a printer applicator.

18. The modular handling system of claim 1, further comprising a box cutter.

19. A method for transporting cases between locations, the method comprising:
providing the modular handling system as in claim 1;
selectively configuring the conveyor path about the work space by operatively connecting the at least one collapsible wing to the at least one mobile base; and
passing the cases about the conveyor path.

20. The method of claim 19, further comprising selectively moving the wing frame and the collapsible legs between the operational position and the collapsed position.

21. The method of claim 19, further comprising collapsing the at least one collapsible wing about the at least one mobile base by folding up the at least one collapsible wing about the at least one mobile base and collapsing the collapsible legs about the wing frame.

22. The method of claim 19, further comprising collapsing the at least one collapsible wing about the at least one mobile base by folding wing sections of the at least one collapsible wing.

23. The method of claim 19, further comprising sorting the cases.

24. The method of claim 19, further comprising selectively adjusting the passing.

25. The method of claim 19, wherein the selectively configuring comprises operatively connecting one of the at least one collapsible wings to each side of one of the at least one mobile bases.

26. The method of claim 19, further comprising collapsing at least one of the at least one collapsible wings about one of the at least one mobile bases.

27. The method of claim 19, wherein the passing comprises transferring the cases from each of the at least one mobile bases to one of a left, a right and a forward one of the at least one collapsible wings.

28. The modular handling system of claim 1, further comprising:
a sorting system comprising at least one sorter mounted to the at least one mobile base, each of the at least one sorters operatively connectable to a corresponding one of the at least one mobile bases to identify and route the cases thereabout, the at least one sorter interactively coupled for communication therebetween whereby the cases are selectively movable about the conveyor path.

29. The modular handling system of claim 28, further comprising a modular communication link removably coupling a plurality of the at least one sorter.

30. The modular handling system of claim 28, wherein the at least one sorter comprises at least one human interface, at least one scanner, at least one processor, and at least one power supply.

31. The modular handling system of claim 30, wherein the at least one scanner is operatively connectable to the base diverter to selectively divert the cases between the at least one mobile base and a corresponding one of the at least one collapsible wings.

32. The modular handling system of claim 28, wherein the at least one collapsible wing is collapsible about the at least one mobile base.

33. The method of claim 19, further comprising:
sorting the cases by scanning the cases and defining a route about the conveyor path based on the scanning.

34. The method of claim 33, further comprising removably coupling a sorting system about the at least one mobile base, the sorting system comprising at least one sorter to perform the sorting.

35. The method of claim 34, further comprising communicatively coupling each of the at least one sorter.

36. The method of claim 34, further comprising identifying the at least one mobile base and the at least one collapsible wing with the at least one sorter.

37. The method of claim 33, wherein the sorting further comprises identifying dimensions of the cases and wherein the passing comprises passing the cases according to the identified dimensions.

38. The method of claim 33, wherein the selectively configuring comprises operatively connecting a plurality of the at least one mobile bases and a plurality of the at least one collapsible wings, the method further comprising selectively adjusting the route about portions of the conveyor path.

39. The method of claim 33, further comprising repeating the method in a different configuration about the work space.

40. The modular handling system of claim 1 further comprising:
a receiving unit comprising:
a conveyor;
a scanner;
a sorter comprising:
a case transfer or diverter comprising the at least one mobile base;
a plurality of the at least one collapsible wings; and
a distributed computing system comprising:
a plurality of processing units connected therebetween by a communications network.

41. The modular handling system of claim 40, wherein the receiving unit further comprises a printer.

42. The modular handling system of claim 40, wherein at least one of the plurality of the at least one collapsible wings folds into a vertical position substantially aligning with a side edge of the case transfer.

43. The modular handling system of claim 40, wherein at least one of the plurality of the at least one collapsible wings of the sorter is a powered conveyor.

44. The modular handling system of claim 40, wherein at least one of the plurality of the at least one collapsible wings of the sorter is a gravity conveyor.

45. The modular handling system of claim 40, wherein at least one of the plurality of the at least one collapsible wings of the sorter comprises a collector.

46. The modular handling system of claim 1, wherein, when the at least one collapsible wing is in the operational position, the at least one collapsible wing and the at least one mobile base are fixed, and wherein, when the at least one collapsible wing is in the collapsed position, the at least one mobile base and the at least one collapsible wing are mobile.

47. The modular handling system of claim 1, further comprising a connector to connect the at least one collapsible wing to at least one of another collapsible wing, another mobile base, and a fixed conveyor.

48. The modular handling system of claim 1, wherein the at least one collapsible wing is connectable to at least one of other collapsible wings, other mobile bases, and fixed conveyors.

49. The handling system of claim 1, wherein the at least one collapsible wing comprises a pair of wing sections, each of the pair of wing sections comprising wing portions with a hinge connection therebetween.

* * * * *